US011158431B2

(12) United States Patent
Schönfeldt et al.

(10) Patent No.: US 11,158,431 B2
(45) Date of Patent: Oct. 26, 2021

(54) MOLTEN SALT REACTOR WITH MOLTEN MODERATOR SALT AND REDOX-ELEMENT

(71) Applicant: Seaborg ApS, København N (DK)

(72) Inventors: Troels Schönfeldt, København NV (DK); Jimmy S. Nielsen, Roskilde (DK); Eirik E. Pettersen, København S (DK); Andreas V. Pedersen, København Ø (DK); Daniel J. Cooper, København Ø (DK)

(73) Assignee: SEABORG APS, København N (DK)

( * ) Notice: Subject to any disclaimer, the term of this patent is extended or adjusted under 35 U.S.C. 154(b) by 0 days.

(21) Appl. No.: 16/622,729

(22) PCT Filed: Jun. 15, 2018

(86) PCT No.: PCT/EP2018/065989
§ 371 (c)(1),
(2) Date: Dec. 13, 2019

(87) PCT Pub. No.: WO2018/229265
PCT Pub. Date: Dec. 20, 2018

(65) Prior Publication Data
US 2020/0105424 A1    Apr. 2, 2020

(30) Foreign Application Priority Data

Jun. 16, 2017  (EP) .................................... 17176462

(51) Int. Cl.
*G21C 5/12* (2006.01)
*G21C 1/22* (2006.01)
(Continued)

(52) U.S. Cl.
CPC ................. *G21C 5/12* (2013.01); *G21C 1/22* (2013.01); *G21C 3/24* (2013.01); *G21C 3/54* (2013.01);
(Continued)

(58) Field of Classification Search
CPC ... G21C 5/12; G21C 5/16; G21C 5/28; G21C 5/123; G21C 1/22; G21C 3/54;
(Continued)

(56) References Cited

U.S. PATENT DOCUMENTS

2013/0083878 A1   4/2013  Massie et al.
2015/0243376 A1   8/2015  Wilson
(Continued)

FOREIGN PATENT DOCUMENTS

CN       104637551 A   *  5/2015  ......... C04B 35/5615
GB       2508537 A        6/2014
(Continued)

OTHER PUBLICATIONS

Delpech, S., Cabet, C., Slim, C., & Picard, G. S. (2010). Molten fluorides for nuclear applications. Materials Today, 13(12), 34-41. (Year: 2010).*
(Continued)

*Primary Examiner* — Darlene M Ritchie
(74) *Attorney, Agent, or Firm* — Fox Rothschild LLP; Carol E. Thorstad-Forsyth

(57) ABSTRACT

Device for producing energy by nuclear fission, and methods of using same. The device comprises a core container of a core container material, which core container encloses an inner tubing of an inner tubing material. The inner tubing and/or the core container has(have) an inlet and an outlet. The device also comprises a molten fuel salt with a fissionable material and a molten moderator salt comprising metal hydroxide(s), metal deuteroxide(s) or a combination thereof and a redox-element having a reduction potential, which is larger than that of the inner tubing material or of the inner tubing material and the core container material. The molten moderator salt is located in the core container, and the molten fuel salt is located in the inner tubing. Alternatively,
(Continued)

the molten fuel salt is located in the core container, and the molten moderator salt is located in the inner tubing.

25 Claims, 5 Drawing Sheets

(51) Int. Cl.
  *G21C 3/54* (2006.01)
  *G21C 5/16* (2006.01)
  *G21C 17/022* (2006.01)
  *G21C 3/24* (2006.01)
  *C23F 11/06* (2006.01)
(52) U.S. Cl.
  CPC ........... *G21C 5/16* (2013.01); *G21C 17/0225* (2013.01); *C23F 11/06* (2013.01); *Y02E 30/30* (2013.01)
(58) Field of Classification Search
  CPC ...... G21C 3/24; G21C 19/30; G21C 17/0225; Y02E 30/30; C23F 11/00; C23F 11/04; C23F 11/06; C23F 11/08
  See application file for complete search history.

(56) References Cited

U.S. PATENT DOCUMENTS

| | | |
|---|---|---|
| 2016/0005497 A1 | 1/2016 | Scott |
| 2018/0322964 A1* | 11/2018 | Leblanc ................... G21C 3/24 |
| 2019/0057783 A1* | 2/2019 | Leblanc ................... G21D 9/00 |

FOREIGN PATENT DOCUMENTS

| | | |
|---|---|---|
| WO | 2013116942 A1 | 8/2013 |
| WO | 2017060741 A1 | 4/2017 |

OTHER PUBLICATIONS

Ho, M. K. M., Yeoh, G. H., & Braoudakis, G. (2013). Molten salt reactors. Materials and Processes for Energy, Formatex, 761-768. (Year: 2013).*
C.E. Teeter et al.: "The Catalog of nuclear reactor concepts", Argonne National Library, USA, 1965.
G.P. Smith: "Corrosion of materials in fused hydroxides", Oak Ridge National Laboratory, USA, 1956.
Williams et al., "The Reactions of Molten Sodium Hydroxide with Various Metals" 1956, Naval Research Laboratory, 78: 5150-5155.
International Search Report dated Jul. 27, 2018 in PCT/EP2018/065989 filed Jun. 15, 2018.
J. Goret and B. Tremillon, Electrochim. "Propriétés chimiques et électrochimiques en solution dans les hydroxydes alcalins fondus" Acta. 12 (1967) 1065-1083.
Chemistry in Non-Aqueous Solvents, B. Tremillon, 1874, p. 194-195.
ORNL Aircraft Nuclear Power Plant Designs, 1954 (ORNL-1721).
Gibilaro et al. "A Way to Limit the Corosion in the Molten Salt Reactor Concept: The Salt Redox Potential Control." (2015) Electrochimisa Acta, 160. 209-213. ISSN 0013-4686.
"An Advanced Molten Salt Reactor Using High-Temperature Reactor Technology", Proceedings of ICAPP '04, Pittsburgh, PA USA, Jun. 13-17, 2004, Paper 4152 (Introduction).
"Validation of Actinide Fluoride Simulators for Studying Solubility in Fuel Salt of Molten-Salt Reactors", Atomic Energy, vol. 112, No. 6, Oct. 2012 (Russian Original vol. 112, No. 6, Jun. 2012).

* cited by examiner

MOLTEN SALT REACTOR WITH MOLTEN MODERATOR SALT AND REDOX-ELEMENT

CROSS-REFERENCE TO RELATED APPLICATIONS

The present application is a U.S. National Phase of International Patent Application No. PCT/EP2018/065989, filed on Jun. 15, 2018, which claims priority to European Patent Application No. 17176462.4, filed on Jun. 16, 2017. The contents of the listed patent documents are incorporated herein by reference in their entireties.

FIELD OF THE INVENTION

The invention relates to molten salt nuclear fission reactors comprising a reactor core, the reactor core comprising a molten fuel salt with a fissionable material, a molten moderator salt with a moderator material for neutron moderation. In the following, such reactors will simply be referred to as molten salt reactors or MSR. The invention also relates to methods of controlling nuclear fission processes using the molten moderator salt in a nuclear fission reactor.

The invention more particularly relates to moderator materials for MSRs, to a method for moderating an MSR, and to the use of a moderator material in an MSR.

PRIOR ART

Nuclear fission produces energetic neutrons typically at an energy range from 100 keV to 2 MeV. The probability of a fission event occurring depends on the neutron energy. In a so-called fast reactor, the unmoderated neutrons produced from fission interact directly with other nuclei. Thermal and epi-thermal nuclear fission reactors rely on moderators to reduce the energy to increase fission probability. Nuclear fission reactors thus can be operated by two different principles, namely fast reactors and thermal and epi-thermal reactors.

In a fast reactor, the energetic neutrons interact directly with fissile material to produce energy, fission products and energetic neutrons. Fast reactors do not rely on having a moderator and will not be considered in this patent.

In thermal and epi-thermal reactors, the energetic neutrons produced by fission exchange energy with a moderator and eventually interact with fissile material to produce energy, fission products and more energetic neutrons. Second and third generation Light Water Reactors (LWR) are typical examples of such reactors and are workhorses of the commercial nuclear reactor fleet. Water-cooled reactors have an inherent disadvantage in the fact that the cooling water must be kept at very high pressure in order to reach a reasonable high operating temperature. Steam and gas explosions as a result of various failures in such constructions have resulted in some of the most serious incidents in the nuclear industry. Similar disadvantages occur for water used as a moderator.

Regardless of which design choice is made with regards to the fissile fuel, the energetic neutrons must be slowed down by interacting with a moderator material in thermal and epi-thermal nuclear fission reactors. For second and third generation nuclear reactors, the fissile material is kept in a fissile carrier in solid form, as a mixture of metal or a metal oxide inside a hollow tube. The fissile material is invariably in a solid state and is therefore stationary. Newer third and fourth generation fission reactors are typically based on solid ceramic oxide fuel but also include new designs where the fissile material is either solid and stationary (e.g. the pebble bed reactor); liquid and stationary (the stable salt reactor); or liquid and circulating (the molten salt reactor).

Regardless of the design choices made related to the fuel, a suitable moderator material should generally offer the following characteristics for the interaction between neutrons and fissile atoms:

It should present high probability of interaction by scattering. This equates to a short mean free path of the neutrons between interactions, and influences the size of the moderator and reactor core.

It should consist of light-weight moderator atoms. In a scattering event the neutrons transfer energy to the moderating material and are slowed down. The lighter the atom the more energy is transferred per interaction.

It should present low probability of neutron absorption. Absorption in the moderator decreases the neutron flux available for fission, and increases the severity of activation of materials. Thus, it is typically favourable to have low absorption in the moderator.

The ideal moderator should offer a number of additional characteristics:

It should be in liquid state under operating conditions. Using a moderator in liquid phase offers cooling possibilities that are not available using a solid state moderator. It also improves longevity under neutron irradiation and enables chemical reprocessing.

It should be operable at high temperature. A high operating temperature in the reactor core has the potential for exchanging more energy with the outer cooling loop, and therefore bears the possibility of having a higher reactor efficiency. Higher temperature also results in higher turbine efficiency, and enables heat production for different industrial processes.

It should allow a low operating pressure. A low operating pressure reduces the complexity of the safety features needed to mitigate risks caused by incidents. It also reduces the demand on structures and engineering.

The moderator materials should be available in sufficient amounts on the world market, in steady supply, and at predictable price levels.

The materials used should not pose additional chemical or environmental risks.

The requirements listed above limit the options to the lighter atoms hydrogen, deuterium, lithium, beryllium, and carbon, while no single element of these meets all the requirements listed above.

Table 1 below summarises moderating properties of various prior art moderator materials. $\zeta$ is the average number of scattering events necessary to reduce the energetic neutrons to thermal energy levels, MFP is the mean free path for elastic scattering measured in cm, and $\Sigma_{abs}$ is a measure of the number of neutrons absorbed per meter.

TABLE 1

Moderating effect of various prior art moderator materials.

| Material | $\zeta$ [#] | $MFP_{ela}$ [cm] | $\Sigma_{abs}$ [1/m] | Comment |
|---|---|---|---|---|
| $H_2O$ (liq) | 24.8 | 0.66 | 2.226 | Very compact |
| $D_2O$ (liq) | 33.4 | 2.77 | 0.001 | Exceptional moderator, not compact |
| C (graphite) | 110.9 | 2.50 | 0.030 | Exceptional moderator, not compact |

TABLE 1-continued

Moderating effect of various prior art moderator materials.

| Material | ζ [#] | MFP$_{ela}$ [cm] | Σ$_{abs}$ [1/m] | Comment |
|---|---|---|---|---|
| CH$_2$ (polyethylene) | 24.3 | 0.56 | 2.589 | Very compact (Not suitable for high temperature conditions) |
| $^7$Li | 67.2 | 22.15 | 0.207 | Unsuited due to moderator size |
| $^{23}$Na | 207.1 | 11.86 | 1.346 | Not moderating |
| Be | 84.7 | 1.29 | 0.094 | Exceptional moderator, expensive |
| 2 $^7$LiF:1 BeF$_2$ | 25.9 | 2.97 | 0.201 | Very good but expensive and difficult to enrich $^7$Li |
| MgO | 174.7 | 2.53 | 0.339 | Not moderating |

The information in Table 1 above leads to the following conclusions: Water (H$_2$O) is a very compact moderator. Deuterated water (D$_2$O), beryllium (Be) and graphite (C) are exceptionally good moderators in terms of low neutron absorption. This comes as no surprise as this is reflected in the current use in commercial and research reactors. Furthermore, pure lithium (Li) is unsuitable owing to the large moderator size required. Pure sodium (Na) does not moderate in any practical sense. The stoichiometric compound 2 $^7$LiF:1 BeF$_2$ is a good moderator. Magnesium oxide (MgO) does not moderate. MgO is included as an example of a ceramic material. $^7$LiOH is a compact moderator, and has low absorption.

Molten salt reactors are based on a critical concentration of a fissile material dissolved in a molten salt. The molten salts may have a base of $^7$LiF with a content of fluoride salts of fissile elements and other components. This is commonly referred to as the fuel salt. MSRs were researched into at i.a. the Oak Ridge National Laboratory in the 1950's and 1960's but have never been successfully commercialised. MSRs have several advantages over other reactor types, including those being in commercial use nowadays. MSRs are capable of breeding fissile $^{233}$U from thorium, of producing much lower levels of transuranic actinide waste than uranium/plutonium reactors, of operating at high temperatures, of avoiding accumulation of volatile radioactive fission products in solid fuel rods and of combusting greater amounts of fissile material than is possible in conventional reactors.

Several disadvantages encountered in the 1950's and 1960's caused MSRs to not be commercialized. One disadvantage lies in that most types of MSRs exploited employ graphite as a neutron moderator.

Graphite consists of carbon atoms arranged in a hexagonal lattice, and is used as a neutron moderator for at least three reasons. Firstly, carbon atoms with a mass of 12 u (unified atomic mass units) are fairly light in comparison to neutrons that weigh 1 u. As a result, the colliding neutron is able to lose a fair amount of energy in each elastic scattering event with a carbon atom. Moreover, graphite is fairly dense and the scattering cross section of carbon is acceptable, so that collisions are frequent. A value-of-merit that includes both the density and moderating efficiency of a moderator is the slowing down power, SDP, defined as $$SDP=\zeta*N*\sigma_s,$$

where ζ is the average number of scattering events required for a fast neutron to thermalize, N is the atom density, and as is the microscopic elastic scattering cross section. For graphite, the SDP is 0.060. It should be noted that the higher the SDP the better. Secondly, the microscopic absorption cross section of natural carbon is exceptionally low. Thirdly, graphite is abundant, fairly cheap, and has favourable thermal and structural properties for use in a reactor.

However, as a moderator graphite has several disadvantages, including the following:

A considerable volume of graphite is needed to obtain the desired level of neutron moderation, leading to large reactor cores.

Solid graphite takes damage from neutron irradiation, as high energy neutrons impinge and damage the crystalline structure of the graphite. This, together with corrosion of the structural materials, currently represents the limiting lifetime factor for graphite-moderated reactor cores.

There are considerable difficulties, and thus also costs, involved in producing reactor-grade graphite of sufficient purity, homogeneity and density.

The graphite in an MSR core becomes activated by high-energy neutrons producing $^{14}$C with a half-life of 5730 years requiring decommissioned graphite being stored as high-level nuclear waste for considerable time.

At high temperatures graphite burns when in contact with air and further has complex temperature expansion reactivity coefficients, which are directional dependent and changes with irradiation of the graphite.

From a purely reactor physical point of view, ZrH$_x$ is a very good moderator. Since the zirconium component has a fairly small (total) microscopic cross section, the moderating properties of ZrH$_x$ are dominated by the lone proton that constitutes the hydrogen nucleus. Hydrogen, with an atomic mass of 1 u, maximizes the energy that can be exchanged with an incident neutron. As a result, and since ZrH$_x$ has a density of more than 5 g/cm$^3$, the hydrogen density is very high even for low values of x. Consequently, ZrH$_x$ exhibits an excellent slowing down power. For instance, with a hydrogen fraction of x=1.8, ZrH$_x$ has a slowing down power of 2.91. The use of ZrH$_x$ as a moderator in MSRs has recently been described in US 2013/083878 (also published as WO 2013/077941 A2).

However, despite its superior moderation properties, ZrH$_x$ has not found widespread usage for reactor applications. This is because of several reasons. Firstly, ZrH$_x$ has a complex structural behaviour that depends on both hydrogen content and temperature. It is well known that there is only a small region around x=1.6 where ZrH$_x$ does not undergo a phase transformation when exposed to temperatures within the normal operating space for molten salt reactors. Secondly, the hydrogen content in ZrH$_x$ also depends on temperature. Thus, under steady-state operation, when a temperature gradient will exist within the moderator because of neutron and gamma heating, a hydrogen gradient inside the ZrH$_x$ is present, further complicating the prediction of its structural behavior. Under larger temperature fluctuations resulting from load-following or an accidental scenario, hydrogen will relocate within the moderator, and be emitted or potentially absorbed at the surface, again changing the amount of hydrogen in the ZrH$_x$.

Further disadvantages relating to ZrH$_x$ as a moderator include the following:

ZrH$_x$ burns at high temperatures in the presence of air.

ZrH$_x$ reacts exothermically when in contact with molten salts, potentially releasing combustible hydrogen gas.

ZrH$_x$ produces combustible hydrogen and oxygen gas when in contact with water at high temperatures.

To separate ZrH$_x$ from the molten salt, exotic cladding materials are required that have i) high reliability, ii)

low permeability, and iii) can sustain a high back pressure, potentially resulting from a release of hydrogen gas.

$ZrH_x$ is quite expensive, and at least more expensive than graphite. This is partly caused by a costly separation process of Zirconium and Hafnium when producing nuclear-grade Zirconium, which is necessary because Hafnium has a large neutron capture cross section.

In order to minimize hydrogen relocation within the $ZrH_x$ moderator, a sophisticated cooling scheme is required to control the temperature at all times.

Thus, there is a general desire in the art to provide an MSR with an alternative moderator material.

C. E. Teeter et al.: "*The Catalog of nuclear reactor concepts*", Argonne National Library, USA, 1965, (Teeter et al.) discloses a large number of different molten salt reactor concepts that were scientifically investigated up until 1965. In addition to different concepts using graphite or $ZrH_x$ as moderator, Teeter et al. also discloses the use of sodium hydroxide (NaOH), $^7$LiOH and $^7$LiOD as combined moderators and coolants in suspension reactors intended for propulsion of different means of transportation, and especially of aeroplanes and submarines, and all having circulating moderators. It is noted that in reactors used for propulsion of moving devices and thus being moved, often with rapid and/or sudden movements, forced circulation of the moderator is a necessity in order to provide sufficient cooling to avoid overheating of the reactor core. Teeter et al. also mentions several discouraging problems with hydroxides and especially NaOH as a moderator. It is stated that is very difficult to dissolve Uranium compounds in NaOH, and that hydroxides cause so small conversion ratios that internal breeding is not feasible when a small critical mass is required. Most importantly, it is also stated that hydroxides and deuteroxides, especially NaOD, are very corrosive, and especially that substitution of circulating hydroxides and deuteroxides, especially NaOD, lead to problems with corrosion.

G. P. Smith: "*Corrosion of materials in fused hydroxides*", Oak Ridge National Laboratory, USA, 1956, (G. P. Smith) also emphasises the corrosion problems encountered with hydroxides, especially NaOH, and mentions that they are caused by hydroxyl ions and/or alkali metal ions. G. P. Smith also states that corrosion is especially great when impurities are present. Furthermore, G. P. Smith states that studies have been made on at least 31 elemental metals and 65 alloys, all exhibiting corrosion when subjected to fused hydroxides.

Thus, these two documents directly teach against the use of metal hydroxides as neutron moderators in MSRs. There is in other words a clear prejudice in the art teaching to not use metal hydroxides in general, and sodium and lithium hydroxides in particular, as moderators in fission reactors, in particular in molten salt reactors.

Also, GB 960,720 A, published 17 Jun. 1964, discloses a number of ceramic substances usable as neutron moderators which remain solid even at high temperatures (1000-2000° C.). Amongst the substances suggested in GB 960,720 A are $CaZrO_2H_{1.8}$, $LiZr_{0.2}O_{0.5}H_{2/3}$ and $CeO_{3/4}H_{1.5}$. These substances are all metal oxides which have been hydrogenated, i.e. in which hydrogen has been absorbed into the crystal lattice. However, solid moderators are unfavourable in MSRs due to the structural degradation from neutron irradiation, as well as waste concerns arising from neutron activation of such moderators. Also, the cooling effect of solid moderators is low or even negligible, thus creating the need for a separate cooling system, which in turn leads to large reactor cores.

A second disadvantage contributing to MSRs never having been commercialized lies in that insoluble fission products would foul pumps and heat exchangers of the MSR. Most exploited designs of molten salt reactors therefore require attached reprocessing plants to continually remove fission products from the fuel salt. This in turn renders the MSRs complex, expensive, and requiring extensive development work.

A third disadvantage, probably being the most decisive of the disadvantages contributing to MSR never having been commercialized, is that molten salts are highly corrosive. This has caused extensive research into development of corrosion-resistant metal alloys. While some suitable metal alloys, such as Nickel based superalloys, have in fact been developed, these alloys are extremely expensive and corrosion would nevertheless typically still occur after long time periods.

New composite materials based on carbon and/or carbides, e.g. silicon carbide have, in principle, the chemical resistance to withstand the molten salt, but building complex structures from such materials is both very challenging and very expensive.

For at least the above-mentioned reasons, research in molten salt reactors was generally abandoned in the late 1960's in favour of sodium fast reactors or traditional fission reactors of the type being in common use to this day.

Since then, there has been an exclusive focus on graphite and water as moderators in fission reactors.

Recently, MSRs have enjoyed renewed attention. In these new attempts however, with regards to moderator materials, focus has remained almost exclusively on graphite, with the exception of above-mentioned US 2013/083878 in which the use of hydrides as a moderator, in particular $ZrH_x$ are suggested.

Further examples of MSRs are disclosed in US 2015/243376 and US 2016/005497. US 2015/243376 discloses a modular fission reactor having a core reactor vessel comprising a vessel housing a molten salt and fuel combination. The vessel housing includes a protective layer lining the interior of the vessel housing; the protective layer may comprise graphite or coated ceramic materials.

US 2016/005497 discloses a nuclear fission reactor having a core with an array of hollow fuel tubes, each containing molten salt of one or more fissile isotopes. The fuel tube array is immersed in the pool of coolant liquid. Heat transfer from the molten salt in each fuel tube to the exterior of the tube may be achieved by natural convection, mechanical stirring, oscillating molten salt flow or boiling of the molten salt. Corrosion resistant alloys, e.g. nickel alloys, are generally relied on for protection against corrosion, although it is suggested to include samples of zirconium metal in the coolant salt.

Hence, there remains to this day a desire in the art to provide MSRs with an alternative moderator material which alleviates the disadvantages relating to the use of graphite and $ZrH_x$, but also to the use of water, as water as a moderator comes with its own disadvantages, most importantly a very low melting point compared to the temperatures required to keep the fuel salt molten.

SHORT DESCRIPTION OF THE INVENTION

It is therefore an object of the invention to provide a moderator in a molten salt reactor (MSR), which alleviates the above-mentioned problems and allows the construction of small-scale reactors.

A further object of the invention is to simultaneously solve the above-mentioned problems relating to corrosion in molten salt reactors.

According to a first aspect of the invention, these and other objects are achieved by means of a device adapted for producing energy by nuclear fission, the device comprising a core container of a core container material, which core container encloses an inner tubing of an inner tubing material, the inner tubing and/or the core container having an inlet and an outlet, the device further comprising a molten fuel salt with a fissionable material and a molten moderator salt comprising at least one metal hydroxide, at least one metal deuteroxide or a combination thereof and a redox-element having a reduction potential, which is larger than that of the inner tubing material or of the inner tubing material and the core container material, wherein the molten moderator salt is located in the core container and the molten fuel salt is located in the inner tubing, or wherein the molten fuel salt is located in the core container and the molten moderator salt is located in the inner tubing. The moderator material is arranged and adapted for moderating fission neutrons created in a fission reaction process occurring in the reactor core, and comprises at least one metal hydroxide, at least one metal deuteroxide or a combination thereof. The moderator may thus be a metal hydroxide and/or a metal deuteroxide. In the context of the invention the two terms may be used interchangeably so that when "hydroxide" or "deuteroxide" are mentioned alone it should be interpreted as "hydroxide and/or a deuteroxide", in particular in the context of chemical reactions.

In an embodiment, the at least one metal hydroxide and/or the at least one metal deuteroxide comprises a metal chosen from the group of metals comprising alkali metals, alkaline earth metals, or combinations of alkali metals and alkaline earth metals. Relevant alkali metals comprise lithium (Li), especially $^7$Li, sodium (Na), potassium (K), rubidium (Rb), caesium (Cs). Likewise, relevant alkaline earth metals comprise magnesium (Mg), calcium (Ca), beryllium (Be), strontium (Sr), barium (Ba). The hydroxides used in the present invention as moderators are liquid, i.e. molten salts, and therefore no structural damage from neutron irradiation is incurred. For hydroxides, and especially for NaOH, most of the isotopes created from neutron capture are either stable (e.g. $^2$H, or "D", and $^{17}$O) or rapidly decay to a stable form (e.g. $^{24}$Na). Therefore, no decommissioning-related concerns are present.

Also, hydroxides, and again especially NaOH, are stable up to their boiling points and do not decompose into other compounds.

Furthermore, the structural behaviour of hydroxides, particularly in the liquid form, is much more predictable than that of (solid) $ZrH_x$. Phase changes may occur within solid NaOH but will not occur in molten NaOH. Finally, hydroxides are cheap to produce and require no complex or sophisticated cooling scheme.

Furthermore, especially while bearing the above-mentioned disadvantages of graphite and $ZrH_x$ in mind, the provision of a moderator material comprising at least one metal hydroxide, at least one metal deuteroxide or a combination thereof has the following further advantages: Hydroxides moderate more efficiently than graphite because scattering mainly occurs with hydrogen atoms, which are distributed with relatively high density. For instance, NaOH exhibits a slowing down power of 0.67, which is about ten times more than that of graphite. Therefore, an MSR with a hydroxide based moderator can be built more compact than a graphite moderator, reducing the overall size of the reactor core. Similar observations are relevant for other hydroxides, especially other hydroxides where the metal is an alkali metal or an earth alkaline metal.

Thus, by providing the moderator material as comprising at least one metal hydroxide, at least one metal deuteroxide or a combination thereof, an MSR is provided with which the problems associated with the prior art moderator materials are alleviated, which is simple and cheap to produce, which may be made very compact and thus opens up new possibilities of small scale deployment, and with which less material needs to be decommissioned when dismantling the MSR.

The moderator material further comprises a redox-element. In particular, the molten moderator salt is in contact with the inner tubing material, and the redox-element may also be in contact, e.g. directly or via the molten moderator salt, with the inner tubing material. The redox-element may also be in contact with the core container material. The redox-element has a reduction potential larger than that of the inner tube material and/or the core container material, as appropriate. Determination of reduction potentials is well-known to the skilled person. However, the present inventors have found that the reduction potentials in molten salts, i.e. under conditions of relevance to the present invention, can readily be estimated from standard electrode potentials. For example, standard electrode potentials can be estimated at a temperature of 298.15K, an effective concentration of 1 mol/l for each aqueous species or a species in a mercury amalgam, a partial pressure of 101.325 kPa (absolute) (1 atm, 1.01325 bar) for a gaseous reagent, and an activity of unity for each pure solid, pure liquid, or for water (solvent).

The inventors have further found that the reduction potential can also be estimated from the electronegativities of the redox-element and the materials of the inner tubing and/or the core container material. For example, in a specific embodiment the inner tubing material comprises a metal, and the redox-element is a metal having an electronegativity according to the Pauling scale, which is lower than the electronegativity of the metal of the inner tubing material and/or the metal of the core container material. In the context of this embodiment the redox-element is generally a metal in its metallic form, i.e. at oxidation level 0. Furthermore, in the context of the invention the terms "reduction potential" and "electronegativity" may readily replace each other with due consideration of the relation between the respective values for the redox-element and the material of the inner tubing and/or the core container. In general, at least the inner tubing material will be in contact with the molten moderator salt and in this embodiment the inner tubing material will comprise, e.g. be made of, a metal, e.g. a metal alloy. When the inner tubing material "comprises" a metal it is to be understood that the inner tubes are generally made from the metal with sections of other metals or materials as appropriate. When the inner tubing material in this embodiment comprises an alloy it is to be understood that electronegativity of the alloy is that of the metal on which the alloy is based, i.e. the metal constituting at least 50% (w/w) of the alloy. However, the alloy may also comprise other metals, e.g. metals having a lower electronegativity than the base metal of the alloy. For example, the alloy may be based on nickel having contents of copper, cobalt, chrome, iron, manganese, etc. Likewise, the redox-element is not limited to a single element but may be a mixture of metals.

The redox-element is not limited to metallic elements, but the redox-element should provide a reduction potential being larger than that of the solid material or materials being in contact, in direct contact or in physical contact with the molten salt, e.g. the molten moderator salt. Any appropriate element or material may be used as the redox-element. In specific embodiments the redox-element comprises, or is, any one of Sr, Ca, Li, Rb, K, Ba, $Li_2C_2$, Na, Mg, Th, U, Be, Al or Zr or combinations thereof. In the context of the invention, when an element is listed alone by their one or two letter symbols it is to be generally understood that they are at oxidation level 0. Thus, when a metal is employed as the redox-element it is understood that it is in its metallic form, i.e. at oxidation level zero. However, when elements are indicated as specific isotopes, e.g. $^{232}Th$, $^{233}U$, these may be at any oxidation level, and in particular they may be part of a salt.

In another aspect the invention relates to the use of a molten salt comprising at least one metal hydroxide, at least one metal deuteroxide or a combination thereof and a redox-element selected from the group consisting of Sr, Ca, Li, Rb, K, Ba, $Li_2C_2$, Na, Mg, Th, U, Be, Al or Zr or combinations thereof for moderating fission neutrons created in a fission reaction process occurring in a reactor core comprising a fissile material. In yet a further aspect the invention relates to the use of a molten salt comprising at least one metal hydroxide, at least one metal deuteroxide or a combination thereof and a redox-element for moderating fission neutrons created in a fission reaction process occurring in a reactor core having a metallic section and comprising a fissile material, wherein the redox-element is a metal having an electronegativity according to the Pauling scale, which is lower than the electronegativity of the metallic section of the reactor core.

In further aspects the invention relates to methods of controlling nuclear fission processes in the device of the invention. Thus, the methods comprise the step of providing a device according to invention and may further comprise the steps of:
  introducing a molten fuel salt into the inner tubing, which molten fuel salt comprises fluorides of an alkali metal and a fissile element,
  introducing into the core container a molten moderator salt comprising at least one metal hydroxide, at least one metal deuteroxide or a combination thereof and a redox-element having a reduction potential, which is larger than that of the inner tubing material or of the inner tubing material and the core container material,
  providing a heat exchanger in fluid communication with the inlet and the outlet of the inner tubing so as to define a heat exchange loop for removing heat from the molten fuel salt circulating in the heat exchange loop,
  circulating the fuel salt in the heat exchange loop so as to control the temperature of the fuel salt in the inner tubing. When the molten fuel salt is introduced into the inner tubing, this should have an inlet and an outlet.

In another aspect the method further comprises the steps of:
  introducing into the inner tubing a molten moderator salt comprising at least one metal hydroxide, at least one metal deuteroxide or a combination thereof and a redox-element having a reduction potential, which is larger than that of the inner tubing material,
  introducing a molten fuel salt comprising fluorides of an alkali metal, and a fissile element into the core container,
  providing a heat exchanger in fluid communication with the inlet and the outlet so as to define a heat exchange loop for removing heat from the molten salt circulating in the heat exchange loop,
  circulating the molten salt in the heat exchange loop so as to control the temperature of the fuel salt in the core container. This aspect may employ any embodiment of the device of the invention. In particular, the inner tubing does not require an inlet and an outlet, so that the moderator salt is stationary in the inner tubing. It is also possible to perform either method of the invention in a device of the invention, where the redox-element is a sacrificial material located on a surface of the inner tubing material or on surfaces of the inner tubing material and the core container material; in this case the molten moderator salt does not need to contain the redox-element as a suspension or in a dissolved or molten form, since the redox-element is present in the device. However, it is also possible for the device to have a redox-element as a sacrificial material located on a surface, while applying a molten moderator salt having a redox-element present therein as a suspension or in a dissolved or molten form.

Any embodiment of the two method aspects may generally take place in any embodiment of the device of the invention. Likewise, any embodiment of the use aspects of the invention may be performed in any embodiment of the device of the invention. However, the use aspects are not limited to the device of the invention, and the use may be performed in any appropriate reactor as desired.

The MSR will typically contain a cover gas above the molten salt, e.g. above the molten fuel salt and/or above the molten moderator salt. The cover gas should be chemically inert, and preferred cover gases include noble gasses, e.g. argon, although the cover gas may contain chemical species which control the redox potential and/or the oxoacidity of the melt, such as $H_2O$, $H_2$, HF, etc. For example, the composition of the cover gas may be amended and controlled together with bubbling gas, e.g. $H_2O$, through the molten moderator salt and/or through the molten fuel salt in the corresponding embodiments and aspects.

The device of the invention has a molten fuel salt and a molten moderator salt. However, the device may also comprise further molten salts having different functions. The device may, for example, comprise a molten coolant salt. Any fuel salt composition may be used in the present invention. For example, the molten fuel salt may comprise any fissionable element, e.g. a fissile actinide, or elements that may be converted to fissile elements, e.g. thorium. In a preferred embodiment the fuel salt has a base of fluorides of alkali metals, e.g. lithium, thorium and a fissile element, e.g. $^7LiF$ with a content of fluoride salts of fissile elements and thorium, and optionally other components. The fuel salt preferably has a eutectic composition, e.g. a base of 78 molar percent $^7LiF$ and 22 molar percent $ThF_4$ supplemented with actinide salts of the composition $LiFAnF_n$ where An is a fissile actinide, and n is 3 or 4.

The fuel salt may be described in terms of a fuel content. In the context of the invention the "fuel content" is the cation molar fraction, expressed with the unit "cmol %", of the fissile actinide fraction, i.e. the sum of the fissile actinides, e.g. $^{233}U$, $^{235}U$, $^{239}Pu$ and $^{241}Pu$, divided by the sum of all the actinides of the fuel salt. Thus, the fuel salt may be represented with the equation:

$$\text{Fuel salt} = a\ NaF + b\ AnF_4$$

where Na represents any alkali metal and An represents one or more actinides; for a=22% and b=78% the mixture is eutectic. Specifically, An of $AnF_4$ may comprise both thorium and fissile elements where the molar content of the fissile elements, in particular $^{233}U$, $^{235}U$, $^{239}PU$ and $^{241}Pu$, is the fuel content and preferably is in the range of 2 cmol % to 10 cmol % of the actinides, i.e. An.

The fuel salt preferably comprises thorium, and neutrons produced during fission of fissile actinides, e.g. $^{233}$U, $^{235}$U and $^{239}$PU, will convert non-fissile $^{232}$Th to fissile $^{233}$U. When the term "fuel content" is used this generally refers to the composition when the fission reaction is initiated. The improved corrosion resistance provided by the redox-element allows a longer lifetime of the device so that a feasible thorium-based nuclear reactor is provided by the invention. Without the corrosion resistance, the molten salt is expected to degrade the device before operation based on generated $^{233}$U is possible.

The fuel salt of the device comprises a fissionable material. In the context of the invention a "fissionable material" is a material that can undergo nuclear fission from thermal neutrons, e.g. a "fissile" material, or a material that can be converted, e.g. by absorption of a neutron, to a fissile material. Thus for example, $^{235}$U, $^{239}$Pu and $^{232}$Th are fissionable materials, and $^{233}$U, $^{235}$U, $^{239}$Pu, and $^{233}$U are fissile materials.

The device of the invention comprises a moderator material in a molten moderator salt. Likewise, the invention relates to the use of the molten salt with the moderator, which is also employed in the methods of the invention. The moderator material comprises, or is, a metal hydroxide, a metal deuteroxide or a combination of a metal hydroxide and a metal deuteroxide. The moderator may have any form appropriate when introduced into the device of the invention. For example, the moderator may be a molten salt, or the moderator may be in a solid form. Molten hydroxide and deuteroxide salts are extremely corrosive, and so far, their use as moderators in nuclear fission reactions has not been practical. It is known to add a metal component to a molten salt in order to manipulate the redox potential and reduce the corrosion caused by the molten salt. For example, in the context of MSR's, metallic beryllium has been added to molten fluorine-lithium-beryllium (FLiBe) to lower the redox potential and almost eliminate corrosion. However, hydroxides in a molten salt are believed to react with most metals, which reduce the hydroxide to $H_2$ according to Reaction (A):

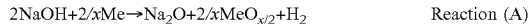  Reaction (A)

It is expected that the formed hydrogen will diffuse away from the molten salt, so that hydrogen will be lost, and the moderating effect will therefore also be lost. Nickel, cobalt, copper and their alloys have been observed (Williams et al., 1956, Naval Research Laboratory, 78: 5150-5155) to be involved in, or cause, the further additional reactions:

  Reaction (B)

  Reaction (C)

  Reaction (D)

Reaction (B), Reaction (C) and Reaction (D) have been interpreted as explaining why nickel based alloys have some inherent resistance to degradation by molten NaOH. However, further protection by addition of a metal other than nickel, copper or cobalt is expected to merely lead to formation of hydrogen gas according to Reaction (A). Thus, by adding a metal to the molten salt of a (metal) hydroxide or deuteroxide it is expected that the moderating effect of the molten salt will be lost. The present inventors have now surprisingly found that when the molten moderator salt comprises a redox-element as defined above, the redox-element will provide the desired protection from corrosion to the container material but without losing the moderating effect. Without being bound by theory the present inventors believe that the addition of the redox-element, e.g. in an amount of the redox-element up to 10% (w/w) of the total of the metal hydroxide and the redox-element, will lead to formation of equilibria in Reaction (A) to Reaction (D) that advantageously prevent removal of hydrogen by diffusion. The present inventors further believe that any $H_2$ formed will also form hydrides with metals present in the respective container material, further leading to retaining the moderator effect. This effect is especially believed to be promoted at the high temperature of the molten salt where $H_2$ is considered to be "forced" into any metals present. The present inventors believe that the hydrides may form in either the core container material, the inner tubing material or both core container material and the inner tubing material. In particular, the molten moderator salt is present either inside the inner tubing or in the core container where the inner tubing is located so that the hydrides may be present in the inner tubing material from where the moderating effect can be provided. Thus, the present invention allows a moderator salt based on hydroxides and/or deuteroxides to control a nuclear fission process. The effect of adding the redox-element is especially pronounced when the inner tubing material, and also the core container material, comprise, e.g. are made from, an alloy based on nickel, copper, cobalt and mixtures thereof, since these metals further Reaction (B), Reaction (C) and Reaction (D). Thus, in a preferred embodiment, the inner tubing material and optionally also the core container material is a nickel based alloy, e.g. a Hastelloy. In the context of the invention a nickel based alloy is an alloy having at least 50% nickel. This is also the case for cobalt and copper based alloys.

In a certain embodiment, the difference between the Pauling electronegativities of the inner tubing material and the redox-element is in the range of 0.8 to 1.2, e.g. the inner tubing material is based on nickel, and the redox-element is based on an alkali metal or an alkaline earth metal. In another embodiment, the difference between the Pauling electronegativities of the inner tubing material and the redox-element is in the range of 0.3 to 0.8. In yet another embodiment, the difference between the Pauling electronegativities of the inner tubing material and the redox-element is at or below 0.3, e.g. the inner tubing material is based on nickel, and the redox-element is a transition metal. The present inventors have surprisingly observed that when the difference in Pauling electronegativities is low, e.g. at or below 0.3, this is sufficient to provide corrosion protection and further advantageously provides that overall less $H_2$ is formed in the molten moderator salt compared to when a bigger difference in electronegativities is employed.

The invention is not limited to employing the redox-element in the molten moderator salt, and the molten fuel salt may also comprise a redox-element. Any redox-element described for the molten moderator salt may be used in the molten fuel salt. The reactor core of the device of the invention further comprises a redox-element as described above. The redox-element may be present in any molten salt employed with the device, e.g. the fuel salt, the moderator as a molten salt or the coolant salt when present. When more than two molten salts are employed each molten salt may have the same or a different redox-element.

The present inventors have observed that the moderating effect of the hydroxides or deuteroxides can be retained when the moderator salt based on hydroxides or deuteroxides comprises up to 10% (w/w) of the redox-element (see e.g. FIG. 6). Thus, in a specific embodiment the concentration of the redox-element is in the range of 1 g/kg to 100 g/kg of the total weight of the molten moderator salt including the redox-element. If the concentration is above 100 g/kg, a sufficient moderating effect is not obtained i.e. the amount of hydrogen/deuterium is too low. In particular, if the concentration is above 100 g/kg, the hydroxide will react with the redox-element to decrease the concentration of the redox-element relative to the remaining salt. However, the moderating effect will not be reobtained even though the amount of redox-element decreases.

A nuclear fission reactor may be described in terms of its power density (P), which refers to the (average) amount of heat produced in the in-core fuel salt per unit volume-time due to nuclear fissions and radioactive decays. When the neutron population in the reactor remains steady from one generation to the next (creating as many new neutrons as are lost), the fission chain reaction is self-sustaining and the reactor's condition is referred to as "critical". Since heat production in an MSR is chain-reaction driven and because no solid fuel is present in the reactor core, the upper theoretical limit on the power density is very high, this being much higher than would be desired during normal operation. Power density can therefore be considered to be a design choice rather than a design feature. The reactor core power density depends on the circulation time, residence fraction, physical properties of the fuel salt and finally on the inlet/outlet temperature difference. A figure of merit for the fuel salt power density in an MSR is given by:

$$\mathbb{P} = \frac{c_{fuel} \rho_{fuel} \Delta T}{f \tau_c}$$

where f is the fuel residence time fraction, $\tau_c$ is the circulation time, $c_{fuel}$ and $\rho_{fuel}$ are the specific heat capacity and the density, respectively, of the molten fuel salt, and $\Delta T$ is the difference between in inlet temperature and the outlet temperature.

As a general rule, higher power densities enable a smaller core volume. However, for a given power output and core volume, the power density should be kept as small as possible to reduce residual heat production from decay products, as well as radiation damage to the core, which reduces the life-time of the reactor. Settling on a specific fuel power density is therefore a trade-off between minimising the core volume and maximising reactor control and life-time.

The reactor core volume depends on the reactor form-factor F. The form-factor is a measure of how much of the core volume consists of fuel, and thereby how much of the core volume contributes to heat production. In a thermal reactor the form-factor is a figure-of-merit of the effectiveness of the moderator. In general, the better moderation, the smaller form-factor, and therefore, since the present invention makes hydroxide/deuteroxide-based moderators available in an MSRs, i.e. due to the corrosion protection afforded by the redox-element, it is possible to greatly improve the form-factor compared to MSRs using other moderators, e.g. graphite. In the following we define the form-factor for a general thermal reactor as the ratio between the total core volume and the in-core fuel salt volume:

$$\mathcal{F} = \frac{V_{core}}{V_{core,fuel}}$$

where $V_{core}$ is the total volume of the core container and $V_{core,fuel}$ is the volume of the fuel, e.g. the volume of the inner tubing or the volume of the core container minus the volume of the inner tubing, depending on the location of the molten fuel salt. Thus, the in-core volumetric moderator to fuel ratio is related to the form-factor through R=F−1 (not taking cladding into account). In an embodiment, the core container, which may be cylindrical, contains the molten moderator salt, and the molten fuel salt is contained in the inner tubing, which comprises tubes, that in this embodiment are referred to as "fuel pins", arranged in a hexagonal pattern, e.g. as depicted in FIG. 3, the form-factor F can be estimated according to:

$$\mathcal{F} = \frac{2\sqrt{3}}{\pi} \left(1 + \frac{l+\delta}{r_{pin}}\right)^2$$

where l is half the distance between neighbouring pins, δ is the fuel pin cladding thickness, i.e. the thickness of the inner tubing material, and $r_{pin}$ is the radius of the fuel pin.

The total volume of the reactor core (not including fuel blanket and shielding) is given by the following value-of-merit valid for a general MSR:

$$V_{core} = \frac{f \mathcal{F} \tau_c P}{c_{salt} \rho_{salt} \Delta T}$$

where f is the fuel residence time fraction, $\tau_c$ is the circulation time, $c_{salt}$ and $\rho_{salt}$ are the specific heat capacity and the density, respectively, of the molten fuel salt. Thus, the smaller form-factor, the smaller core volume for a given power density and power. Thereby, the device of the invention can be made smaller, while retaining a high power, than MSRs of the prior art, since a much smaller form-factor is available using metal hydroxides/deuteroxides as a moderator. This applies when a redox-element is employed or when an electrical current is impressed on the molten salts.

The fuel salt and the moderator are generally separate from each other, although it is also contemplated that they may be mixed with each other. In general, the molten salt, e.g. the fuel salt and/or the moderator material, is contained, e.g. enclosed, in a container. For example, the moderator may be present in the core container or in the inner tubing. Any appropriate material may be selected for either container. However, it is preferred that the core container material and/or the inner tubing material comprise a metal or are metallic. For example, in an embodiment the device has a core container made of one or more corrosion resistant metals or alloys, such as a nickel-based alloy, e.g. Hastelloy. In general, any material of the device may be made of a corrosion resistant metal, e.g. Hastelloy. The same alloys are equally relevant for the inner tubing. Metallic sections of the containers facing the molten moderator salt with the redox-element are believed to take part in the hydride-based effect described above, and metals are preferred as materials for the containers.

It is also contemplated that the corrosion protection may be obtained by impressing an electrical current, e.g. a direct current or an alternating current, on the molten salts, e.g. the molten moderator salt and/or the molten fuel salt. For example, the inner tubing material and/or the core container material may comprise a metal or may be metallic, and the inner tubing material may be used as an anode, and the core container material may be used as a cathode, or vice versa. It is also possible to insert metallic anodes and cathodes into the molten salts. Such anodes may for example be made of, or be coated with, gold or platinum, although other metals are also contemplated.

In general, moderators in a nuclear fission reactor are typically needed in larger volumes than the fissile material, e.g. as a molten salt, and moreover the fissile material, e.g. a molten fuel salt, should be as evenly distributed as possible in the moderator for the moderator to maintain, i.e. moderate, the nuclear fission process. This further means that a molten moderator salt will necessarily have a large contact surface with the container enclosing it, unless the molten moderator salt is mixed with the molten fuel salt. The large contact surface increases corrosion of the container material by the hydroxides or deuteroxides. However, the addition of the redox-element to the molten moderator salt decreases the effect of the corrosion, and the thereby provided availability of the larger surface area maximises the hydride-retaining effect described above.

In an embodiment the redox-element is an alkali metal. Alkali metals will inevitably melt, and may also dissolve, in the molten salt thereby ensuring better mixing of the redox-element. The improved mixing is advantageous in the corrosion protection since the redox-element is efficiently mixed into the moderator salt. In a particular embodiment, the moderator material is an alkali hydroxide or deuteroxide salt, and the redox-element is the same alkali metal. For example, the moderator may be NaOH/NaOD and the redox-element may be Na, or the moderator may be KOH/KOD and the redox-element may be K, etc. Mixtures of metal hydroxides/deuteroxides containing different alkali metals are also possible. When the moderator salt contains a specific metal ion, e.g. sodium, potassium, magnesium, calcium, the specific metal in its metallic form, i.e. as the redox-element, may advantageously dissolve in the molten salt while still retaining its function as the redox-element. Even better mixing is thereby ensured.

The redox-element may be distributed in the molten moderator salt, or the redox-element may be attached to or be part of the surface of the inner tubing material and/or the core container material. Thus, the redox-element may have a melting point lower than the melting point of the moderator salt, e.g. the redox-element may be an alkali metal, which redox-element is molten, e.g. dissolved, in the molten moderator salt. The redox-element may also have a higher melting point than the temperature, e.g. the melting point, of the molten salt and may be present as a suspension of particulate material in the molten salt. For example, the particles may have a size in the range of 0.1 mm to 10 mm. A redox-element employed as a suspension of particulate material in the molten salt or as a molten or dissolved material in the molten salt may be present in an amount in the range of 1 g/kg molten salt to 100 g/kg molten salt, i.e. the molten moderator salt including the redox-element. A particulate redox-element is advantageous since it allows the redox-element in the molten salt to be mixed and thereby reach the surface to be protected from corrosion. Furthermore, addition of additional redox-element is simplified when the redox-element is in a particulate form. When the redox-element comprises particles of a size in the range of 0.1 mm to 10 mm, in particular in the range of 0.5 mm to 2 mm, the redox-element particles will provide a surface area in contact with the molten moderator salt, which is optimal for controlling the reactions according to Reaction (A) to Reaction (D) resulting in sufficient corrosion protection while minimising $H_2$ production. In a specific embodiment, the redox-element is present as a material having a higher melting point than the molten moderator salt, e.g. an alkaline earth metal, a transition metal, a lanthanide and/or an actinide, and the redox-element is present as particles with a size in the range of 0.1 mm to 10 mm, in particular in the range of 0.5 mm to 2 mm, at a concentration in the range of 1 g/kg to 100 g/kg of the total weight of the molten moderator salt including the redox-element. In a further specific embodiment, this redox-element is used with an inner tubing material based on a nickel-based alloy.

In an embodiment of the device of the invention, the redox-element is attached to or is part of a surface. This is generally referred to as a sacrificial material. However, a sacrificial material may also be referred to as a sacrificial anode or a galvanic cathodic protection system. In the context of the invention, the terms "sacrificial material", "sacrificial anode", and "galvanic cathodic protection system" may be used interchangeably, and represent solid structures that are typically located on the surface of the material, e.g. the inner tubing material or the core container material, to provide corrosion protection to the respective material from the molten salt. In these embodiments the redox-element will have a melting point above the temperature of the molten moderator salt. Thus, the redox-element may comprise, or be, any one of Sr, Ca, Ba, $Li_2C_2$, Mg, Th, U, Be, Al or Zr or combinations thereof. A sacrificial material, a sacrificial anode, or a galvanic cathodic protection system may have any shape or form as desired, e.g. as a block or sheet or the like placed on a surface to be protected. The thickness of a block or sheet may typically be up to 10 mm or more. In a specific embodiment, the surface of the inner tubing material or the core container material facing the molten moderator salt, is fitted with the redox-element over a section of the surface in the range of 10% to 90% or the area. The redox-element will typically have a thickness in the range of 0.5 mm to 5 mm.

When the redox-element is a sacrificial material, a sacrificial anode, or a galvanic cathodic protection system, the mass of the redox-element is not limited and may constitute a higher proportion of the combined mass of the metal hydroxide and the redox-element. It is preferred, however, that the volumetric fraction of the redox-element, i.e. as a sacrificial material, a sacrificial anode, or a galvanic cathodic protection system, is in the range of 1% (V/V) to 20% (V/V) of the combined volume of the molten moderator salt and the redox-element.

Sacrificial materials and sacrificial anodes have the advantage of taking up only a limited amount of space in the reactor core and of being simple, fairly cheap and fairly easy to replace. Galvanic cathodic protection systems have the additional advantage of taking up an even smaller amount of space in the reactor core as compared to sacrificial elements since most or all elements of such systems may be placed outside of the reactor core.

The redox-element attracts and is subjected to the chemical reactions with the molten salt causing corrosion of the redox-element in preference to the material to be protected and consequently also protects other elements from corrosion, particularly those in contact with the molten salt within the reactor core. Furthermore, such a protective system may be dimensioned to fit the dimensions of the reactor core, such that it remains possible to provide an MSR with a very compact reactor core structure.

The redox-element may be gradually used up since it is degraded preferentially to materials to be protected, e.g. the redox-element takes part in Reaction (A) to Reaction (D). It is therefore preferred that the redox-element is the same metal as the metal constituent of the molten salt, e.g. the metal constituent of the metal hydroxide or metal deuteroxide or the metal constituent of the fuel salt, if protection from the molten fuel salt is also desired, as appropriate. The metal constituents may also be referred to as metal parts, and the two terms may be used interchangeably. It is to be understood that these metal constituents are in an oxidised form, e.g. a salt form. This simplifies subsequent handling of the respective salt, since no further elements will be added to the salt by degradation of the redox-element.

Molten hydroxides partially dissociate to water and oxide, and the relative concentrations of these species define an "oxoacidity" of the melt. The concept of oxoacidity is analogous to acidity in aqueous solutions, where water dissociates into hydronium ions and hydroxide ions:

$$2OH^- \rightleftharpoons H_2O + O^{2-}$$

$$2H_2O \rightleftharpoons H_3O^+ + OH^-$$

The greater the concentration of water in the melt, the more oxoacidic it is. We define the acidity and basicity of the melt using $pO^{2-}$ or pH2O, a concept similar to the pH scale in water:

$$pO^{2-} = -\log[O^{2-}]$$

$$pH_2O = -\log[H_2O]$$

Corrosion in molten hydroxides can be controlled by maintaining the redox potential and the oxoacidity of the melt at a particular range of values where limited dissolution of the container material occurs. For many metals and alloys, including nickel-based alloys, this is generally an acidic melt with a reducing potential (i.e. a reduction potential of the molten hydroxide which is lower than the reduction potential of the material in contact with the molten hydroxide), but not so reducing as to form hydrogen or hydride. A potential-oxoacidity diagram for nickel in NaOH—KOH eutectic at 227° C. is shown in FIG. 7 (J. Goret and B. Trémilion, Electrochim. Acta. 12 (1967) 1065-1083); from this diagram it can be seen that the formation of soluble nickelate anions, $NiO_2^{2-}$ can be avoided at sufficiently low potential and/or by use of an acid melt (i.e. low values of pH2O). Without being bound by theory, the inventors believe that the potential in a molten salt can be controlled by the relative amounts of multivalent soluble compounds, and the oxoacidity can be controlled by bubbling gas (e.g. $H_2O$ in the case of hydroxides) through the salt or by adding fixed amounts of strong oxide donors (e.g. $Na_2O$). Furthermore, it is contemplated that the oxoacidity can be controlled by controlling the composition of the cover gas, e.g. the partial pressure of $H_2O$ can be controlled. In the context of this invention, the inventors further define the redox-element as a chemical species which can control the redox potential of the molten hydroxide and/or the oxoacidity of the molten hydroxide through, e.g., in the methods described above.

In an embodiment, the redox-element is added to the respective molten salt over time, e.g. the life time of the device. For example, a replacement rate may be defined for the device. The replacement rate may express the amount of redox-element added compared to the amount of redox-element or the molten moderator salt present and it will therefore have a unit of time$^{-1}$, e.g. year$^{-1}$, month$^{-1}$ etc.

In a further embodiment the moderator material is provided in a purity of above 95% or even above 98%. Thereby the presence of impurities, which may otherwise increase the corrosive properties of the moderator material, is minimised or even avoided altogether.

The salts employed in the device of the invention may be free of water, e.g. the salts may be anhydrous. However, salts may contain water as unavoidable impurities. In the context of the invention salts containing only unavoidable impurities of water are referred to as "fused salts", e.g. fused hydroxides or fused deuteroxides. In an embodiment water is not present in the reactor core, i.e. in the core container or in the inner loop. Hydroxide salts of metals, e.g. alkali metals, such as sodium and potassium, are available with considerable amounts of crystal water, and in a specific embodiment the moderator salt is a mixture of anhydrous salt and salts with crystal water to provide a moderator salt with up to 10% (w/w) water, e.g. 5% (w/w) water. Without being bound by theory the present inventors further believe that addition of water, i.e. at up to 5% (w/w), strengthens the effect obtained by addition of the redox-element as described above. When water is present in the salt it may further increase the moderating effect, and the present inventors have observed that the combination of a low water content, i.e. up to 5% (w/w) relative to the amount of metal hydroxide, and the presence of the redox-element are compatible to be used in the molten moderator salt, and provides an increased moderator effect compared to the anhydrous salt. Furthermore, the presence of water in the salt will contribute to the oxoacidity as described above so that further protection from corrosion is obtained when the salt contains water.

In further embodiments the methods of the invention comprise the step of bubbling gas through the molten salt, e.g. through the molten moderator salt and/or through the molten fuel salt. For example, $H_2O$ may be bubbled through the molten moderator salt in an amount in the range of 0% (V/V) to 5% (V/V) per hour relative to the volume of the molten moderator salt. Other amounts of gas, e.g. $H_2O$, may be in the ranges of 0.01% (V/V) to 1% (V/V) per hour, e.g. 0.1% (V/V) to 0.5% (V/V) per hour. The volume of $H_2O$ is normalised to ambient pressure and temperature. The actual amount of $H_2O$ required depends on the material to be protected from corrosion and can be determined by the skilled person, e.g. from B. L. Trémillon, Chemistry in Non-Aqueous Solvents, Springer Netherlands, Dordrecht, 1974. doi:10.1007/978-94-010-2123-4. The gas bubbled through the molten salt may be a pure gas, e.g. $H_2O$, although it may also contain a carrier gas, in particular an inert carrier gas, e.g. a noble gas such as argon. The amount of the active gas, e.g. $H_2O$, may be chosen freely but will generally be in the range of 1% (V/V) to 50% (V/V). In a specific embodiment, gas is bubbled through the molten salts, i.e. the molten moderator salt and/or the molten fuel salt, and the partial pressure and composition of the cover gas is controlled simultaneously. For example, a gas, e.g. with a carrier gas, of the same composition as the cover gas may be bubbled through the molten salts. In yet a further embodiment, the oxoacidity is controlled by controlling the composition and pressure of the cover gas. In particular, the oxoacidity may be controlled by controlling the partial pressure of $H_2O$ in the cover gas. $H_2O$ may be mixed with a noble gas, e.g. argon, in the cover gas when the partial pressure is controlled. The amount of water bubbled through the molten moderator salt may also be expressed in units of mass per volume of molten moderator salt per time, and the amount may be in the range of 0 g/L/hour to 100 g/L/hour, e.g. 0.01 g/L/hour to 10 g/L/hour, or 0.1 g/L/hour to 1 g/L/hour. The gas, e.g. $H_2O$, may also be bubbled through the molten fuel salts, with the same amounts being relevant.

The present inventors have surprisingly found that when the oxoacidity is controlled by bubbling gas, especially $H_2O$, through the molten salts, i.e. the molten moderator salt and/or the molten fuel salt, protection from corrosion does not require a redox-element as defined above. Correspondingly, the oxoacidity may be controlled to provide protection from corrosion by controlling the composition, e.g. with respect to the partial pressure of $H_2O$ in a noble gas, without the need for a redox-element. The partial pressure of $H_2O$ in the cover gas should be in the range of 0 bar to 0.1 bar, e.g. 0.01 bar to 0.05 bar. In particular embodiments, the oxoaciditiy is controlled by bubbling gas through the molten salt(s) combined with controlling the composition of the cover gas, e.g. with respect to the partial pressure of $H_2O$ in the cover gas. Control of the cover gas is particularly relevant when the molten fuel salt is in the inner tubing of the device of the invention. Thus, in a further aspect the invention relates to a method of controlling a nuclear fission process, the method comprising the steps of:

providing a device adapted for producing energy by nuclear fission, the device comprising a core container of a core container material, which core container encloses an inner tubing of an inner tubing material, the inner tubing and/or the core container having an inlet and an outlet, introducing a molten fuel salt into the inner tubing, which molten fuel salt comprises fluorides of an alkali metal and a fissile element, introducing into the core container a molten moderator salt comprising at least one metal hydroxide, at least one metal deuteroxide or a combination thereof, providing a heat exchanger in fluid communication with the inlet and the outlet of the inner tubing so as to define a heat exchange loop for removing heat from the molten fuel salt circulating in the heat exchange loop, circulating the fuel salt in the heat exchange loop so as to control the temperature of the fuel salt in the inner tubing, and bubbling gas, e.g. $H_2O$, through the moderator salt. Alternatively, gas is bubbled through the fuel salt. When gas is bubbled through the fuel salt to provide protection from corrosion, the composition of the gas is chosen with due consideration of the composition of the fuel salt, e.g. the content of fluoride.

In yet a further aspect, the invention relates to a method of controlling a nuclear fission process, the method comprising the steps of:

providing a device adapted for producing energy by nuclear fission, the device comprising a core container of a core container material, which core container encloses an inner tubing of an inner tubing material, the inner tubing and/or the core container having an inlet and an outlet, introducing into the inner tubing a molten moderator salt comprising at least one metal hydroxide, at least one metal deuteroxide or a combination thereof, introducing a molten fuel salt comprising fluorides of an alkali metal, and a fissile element into the core container, providing a heat exchanger in fluid communication with the inlet and the outlet so as to define a heat exchange loop for removing heat from the molten salt circulating in the heat exchange loop, circulating the molten salt in the heat exchange loop so as to control the temperature of the fuel salt in the core container, and bubbling gas, e.g. $H_2O$, through the moderator salt. Alternatively, gas is bubbled through the fuel salt. When gas is bubbled through the fuel salt to provide protection from corrosion, the composition of the gas is chosen with due consideration of the composition of the fuel salt, e.g. the content of fluoride.

In the two aspects not relying on the redox-element all other features may be as for the aspects using the redox-element. The MSR will typically comprise a cover gas, e.g. argon, and it is preferred that the MSR includes a valve in fluid communication with the cover gas, which allows that the pressure of the cover gas can be controlled. The valve may also allow that the cover gas is supplemented with further inert gas, e.g. argon. Furthermore, the valve may also allow addition of $H_2O$, e.g. gaseous $H_2O$, into the cover gas. For these two aspects the present inventors have surprisingly found that when $H_2O$ is bubbled through the molten moderator salt and/or the fuel salt not comprising the redox-element, the container material is protected from corrosion by the molten salts. This is especially relevant for the corrosive hydroxide/deuteroxide salts. In general, $H_2O$ is bubbled through the molten moderator salt in an amount in the range of 0% (V/V) to 5% (V/V), e.g. 0.01% (V/V) to 1% (V/V) or 0.1% (V/V) to 0.5% (V/V) per hour relative to the volume of the molten moderator salt or the molten fuel salt.

By furthermore providing an MSR with a reactor core comprising the redox-element, an MSR is provided with which the problems associated with corrosion stemming from at least one of the moderator material and the molten salt are alleviated. Thereby, both the life-time of the MSR and the safety of the MSR in terms of avoiding any leaks from the reactor core due to corrosion are increased considerably.

In an embodiment the device has an inner tubing that does not comprise an inlet or an outlet so as to enclose the molten moderator salt. The moderator salt may be introduced into the inner loop using any appropriate port in the inner loop, which port is then shut so that the moderator salt cannot leave the inner loop and no further moderator salt can be added. Thereby the moderator material is stationary. In other words, the moderator material in this embodiment is non-circulating in the sense that it is not subjected to any forced circulation, but may however be subject to passive, or convective, circulation. In particular, the inner tubing may be a separate unit, which is inserted into the core container holding the fuel salt. Thereby, an MSR is provided which has a very simple reactor core structure, particularly since elements such as pumps and associated piping for circulating the moderator material may be omitted. In this embodiment the inner tubing with the moderator salt may be designed to have a predetermined life time. Near the end of the life time the inner tubing can simply be lifted out of the fuel salt and a new replacement inner tubing with moderator salt may be introduced into the fuel salt. As soon as the inner tubing is removed, the moderating effect will also be removed and the nuclear fission process will stop. Once the replacement inner tubing is introduced the nuclear fission process can be restarted. Since the hydroxides of the moderator salt may react, e.g. with the inner tubing material and/or the redox-element, $H_2$ may form. However, without being bound by theory the present inventors believe that at the high temperature of the molten salt, any gaseous $H_2$ will be driven into the metals of the inner tubing material and/or the redox-element as hydrides. Thereby, excessive pressure build-up is avoided and the integrity of the inner tubing is ensured, since explosions and the like are avoided. However, it is also possible that the inner tubing, in any embodiment, has a pressure release valve for releasing gaseous build-ups in the inner tubing.

The containers, e.g. the inner tubing and the core container, may have any shape as desired. For example, the container for the fuel salt, whether the inner tubing or the core container, may have an inlet and an outlet allowing a flow of the fuel salt from the inlet to the outlet. Likewise, the container for the moderator material, e.g. the inner tubing, may also have an inlet and an outlet. In another embodiment the container for the moderator material has an opening serving both as an inlet and an outlet.

Nuclear fission in the fuel salt will create heat and it is preferred that the device also comprises a heat exchange system for transporting the heat away from the fuel salt container, e.g. to a turbine or the like for generation of electricity. In particular, if heat is not removed from the molten fuel salt, the molten fuel salt will expand to a point where the nuclear fission reaction will stop. Thus, in the method aspects of the invention the nuclear fission processes are controlled by controlling the temperature of the fuel salt in the inner tubing or in the core container so as to maintain the temperature within the critical temperature range for the respective fuel salt. Any heat exchange system may be chosen for the device. In general, the temperature of the molten fuel salt is in the range of 700° C. to 900° C., e.g. for the nuclear reaction to take place, and the coolant is chosen to work at a temperature in the range of 500° C. to 1000° C. or more. In a specific embodiment the temperature at the inlet is in the range of 400° C. to 800° C., and wherein the temperature at the outlet is in the range of 600° C. to 1000° C. Evidently the temperature at the inlet is lower than the temperature at the outlet. In a preferred embodiment the fuel salt is circulated, e.g. from the inner tubing, to the heat exchange system to cool the fuel salts. In another embodiment, the molten moderator salt is located in the inner tubing and circulated to the heat exchanger so that the moderator salt in turn cools the molten fuel salt to maintain this within the critical temperature.

In yet a further embodiment, the device comprises a separate coolant loop with a molten coolant salt. It is also contemplated that a molten metal, e.g. an alkali metal, may be used as a coolant. The heat exchange system may thus comprise a coolant loop in thermal contact with the molten fuel salt, allowing transfer of heat from the fuel salt to the coolant salt. Any salt may be chosen for the coolant salt. In a specific embodiment the coolant is a salt of the composition 46.5% LiF, 11.5% NaF and 42% KF, although the composition may also be varied. The coolant loop has an inlet for low temperature coolant and an outlet for heated coolant.

The molten moderator material is preferably separated from the fuel salt. For example, the moderator may be contained in the inner tubing, which is located in the core container with the fuel salt, or the fuel salt may be in the inner tubing so that the molten moderator salt is in the core container. In a specific embodiment the device has two sets of inner tubing, where one holds the molten moderator salt and the other holds the molten fuel salt.

The inner tubing may be made from any appropriate material as desired, and heat transfer between the fuel salt and the molten moderator salt is generally not important. It is generally desirable that the inner tubing is distributed through as large a volume of the core container, e.g. with the fuel salt, as possible and therefore, the higher the surface area of the inner tubing to the volume of the core container, the better. The presence of the redox-element in the molten moderator salt, or both molten moderator salt and the fuel salt, allows for a greater surface area of the inner tubing relative to the volume of the core container, since the redox-element reduces corrosion. Likewise, when the molten moderator salt is contained in the inner tubing, which is located in the molten fuel salt, the material of the inner tubing is exposed to molten salts on both sides of the material. Therefore, it is particularly advantageous when both the fuel salt and the molten moderator salt comprises the redox-element, since this allows for a greater surface area of the inner tubing relative to the volume of the fuel salt than when the redox-elements are not used.

Similar observations are relevant when the device comprises a coolant loop. In order to maximise heat transfer from the fuel salt to the coolant, the ratio of surface area of the coolant loop to the volume of the fuel salt should be as large as possible. In particular, the material of the coolant loop should be able to transfer heat away from the molten fuel salt, and therefore metals are preferred as material for the coolant loop. In a certain embodiment, the molten fuel salt and the molten moderator salt, in their respective containers, are enclosed in a generally cylindrical container, and a coolant loop is located on the outer surface of the cylindrical container. Thereby, the coolant material will generally not interfere with the neutrons generated in the fuel salt, and the coolant material may be chosen freely.

The total volume of the core container will typically be in the range of 1 $m^3$ to 5 $m^3$ per 100 MWe. A further advantage of employing the molten moderator salt with the redox-element is that a higher energy density is possible compared to fission reactors based on other principles than using molten fuel salt, but in particular a higher energy density is also possible compared to previous designs of MSRs.

The volumetric ratio between the molten moderator salt and the molten fuel salt, denoted R, may be chosen freely. However, the ratio will to some extent depend on the composition of the fuel salt, e.g. with respect to the concentration of the fissile element(s). For example, for a molten fuel salt with a fuel content of 2 cmol %, the ratio between the molten moderator salt and the molten fuel salt may be in the range of 1 to 1.5. For a molten fuel salt with a fuel content of 4 cmol % the ratio between the molten moderator salt and the molten fuel salt may be in the range of 0.5 to 2. In general, the volume of the salt will be expressed in absolute terms based on the volume of the respective container. For example, the volume of the inner tubing in the core container may be 0.5 to 2 times the volume of the core container minus the volume of the inner tube. The volume of the inner tubing may be calculated from the diameter and length of the inner tubing, and in a specific embodiment the length of the inner tubing, e.g. when the inner tubing is for the molten fuel salt, may be in the range of 1 m to 4 m. In an embodiment the inner tubing comprises a tube of a diameter in the range of 0.2 cm to 30 cm. For a molten fuel salt with a fuel content of 2 cmol % fuel, the diameter will typically be in the range of 1 cm to 5 cm. For a molten fuel salt with a fuel content of 4 cmol % fuel, the diameter will typically be in the range of 0.3 cm to 20 cm. The perimeter of the inner tubing will typically be round. However, the inner tubing is not limited to being round and other shapes are contemplated as well. A round perimeter of the inner tubing is preferred since this shape will minimise the surface area of the inner tubing in contact with the molten salt, i.e. the molten salt on either side of the inner tubing.

The inner tubing may have any shape desired. In particular, the inner tubing will contain angles or curve sections as appropriate for the inner tubing of the desired length to fit within the core container. For example, the inner tubing may contain a meander structure, e.g. a meander structure having a single inlet and a single outlet. A meander structure may be planar, or it may extend in three dimensions. In another embodiment the inlet of the inner tubing comprises a manifold dividing the flow from the inlet into a number of tubes, e.g. 2 to 1000 or more tubes, which may be spaced, e.g. regularly spaced, in the core container. Likewise, the inner tubing may have an outlet with a manifold collecting the flow from a plurality of tubes, e.g. 2 to 1000, into a single outlet tube. In an embodiment the inner tubing has a single inlet and a single outlet, and the inner tube forms a meander extending the three dimensions and providing a regular distance between the sections of the inner tubing. Regardless of the design on the inner tubing the distance between the tubes or the sections of the inner tubing will be in the range of 0.5 cm to 10 cm. For example, when the molten fuel salt has 2 cmol % fuel, the distance will be in the range of 1 cm to 3 cm. When the molten fuel salt has 4 cmol % fuel, the distance will be in the range of 0.5 cm to 6 cm. Correspondingly, the distance between the inner tubes may be in the range of 0.5 cm to 10 cm. In general, when the molten fuel salt is contained in the inner tubing, the diameter of the inner tubes, which in this embodiment may also be referred to as "fuel pins", is correlated with the distance between the pins, which is also influenced by the specific choice of the moderator salt, e.g. with respect to its metal component and the hydroxide/deuteroxide ratio. The diameter of the fuel pins and the distance between them may be calculated by the skilled person.

Advantages related to each of these metals in connection with the present invention will appear from the detailed description below.

In embodiments the at least one metal hydroxide is a fused metal hydroxide of the form $X(OH)_n$, where X is a metal and n is an integer equal to or larger than 1, and/or chosen from the group comprising NaOH, LiOH, $^7$LiOH, RbOH, KOH, $Be(OH)_2$, $Mg(OH)_2$, $Ca(OH)_2$ and $Al(OH)_3$. In similar embodiments the at least one metal deuteroxide is a fused metal deuteroxide of the form $X(OD)_n$, where X is a metal and n is an integer corresponding to the oxidation level of the metal, i.e. n is equal to or larger than 1, and the metal deuteroxide may be chosen from the group comprising LiOD enriched in $^7$Li, RbOD, NaOD, $Be(OD)_2$ and $Mg(OD)_2$.

In an embodiment the moderator material is separated from the fissionable material and the molten salt. Any means of keeping the moderator separate from the molten salt may be used in the invention. For example, the moderator may be separated from the molten salt by means of an element made of or coated with a material resistant to the moderator material, in particular a metal or a metal alloy.

Thereby the moderator material is isolated from the remaining components of the reactor core, and in particular from components of the device outside a cladding of the reactor core, in such a manner that any corrosive effects of the moderator material, in particular on external components such as the core vessel, pumps and heat exchangers, are avoided while the moderating effect is left unaffected.

By any of these embodiments, a device is provided with which the moderating effect of the hydroxide and/or deuteroxide chosen as moderator material is optimised.

By any of these embodiments, a device is provided with which the moderating effect of the hydroxide and/or deuteroxide chosen as moderator material is optimised with respect to the volume of the reactor core, e.g. the core container, and/or the fissionable material, and thus with which the amount of moderator material and therefore also the size of the core container is optimised.

In a further embodiment the reactor core further comprises a coolant and/or a reflector being different from the moderator material. A preferred reflector material is graphite or beryllium. Thereby, a device is provided in which the moderator material may easily, and with a simple reactor structure, be kept stationary, and the corrosive effects of the moderator material may easily be controlled with a simple reactor structure.

The device according to the invention is a molten salt reactor. The molten salt reactor according to the invention may be a molten salt reactor of the burner type or a molten salt reactor of the waste burner type. The molten salt reactor according to the invention may be a molten salt reactor of the breeder type, the breed-and-burn type or the MSR type. In an embodiment, the molten salt reactor may be for supplying energy for propulsion of means of transportation, e.g. the molten salt reactor may be carried on a ship. In another embodiment the molten salt reactor is part of a fixed installation.

It is noted that the invention relates to all possible combinations of features recited in the claims. In particular, any feature mentioned in the context of a specific aspect of the invention is equally relevant for any other aspect of the invention where it provides the same advantage as for the aspect where it is mentioned explicitly.

SHORT DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals, refer to like elements throughout.

DETAILED DESCRIPTION OF THE INVENTION

Figure 1:
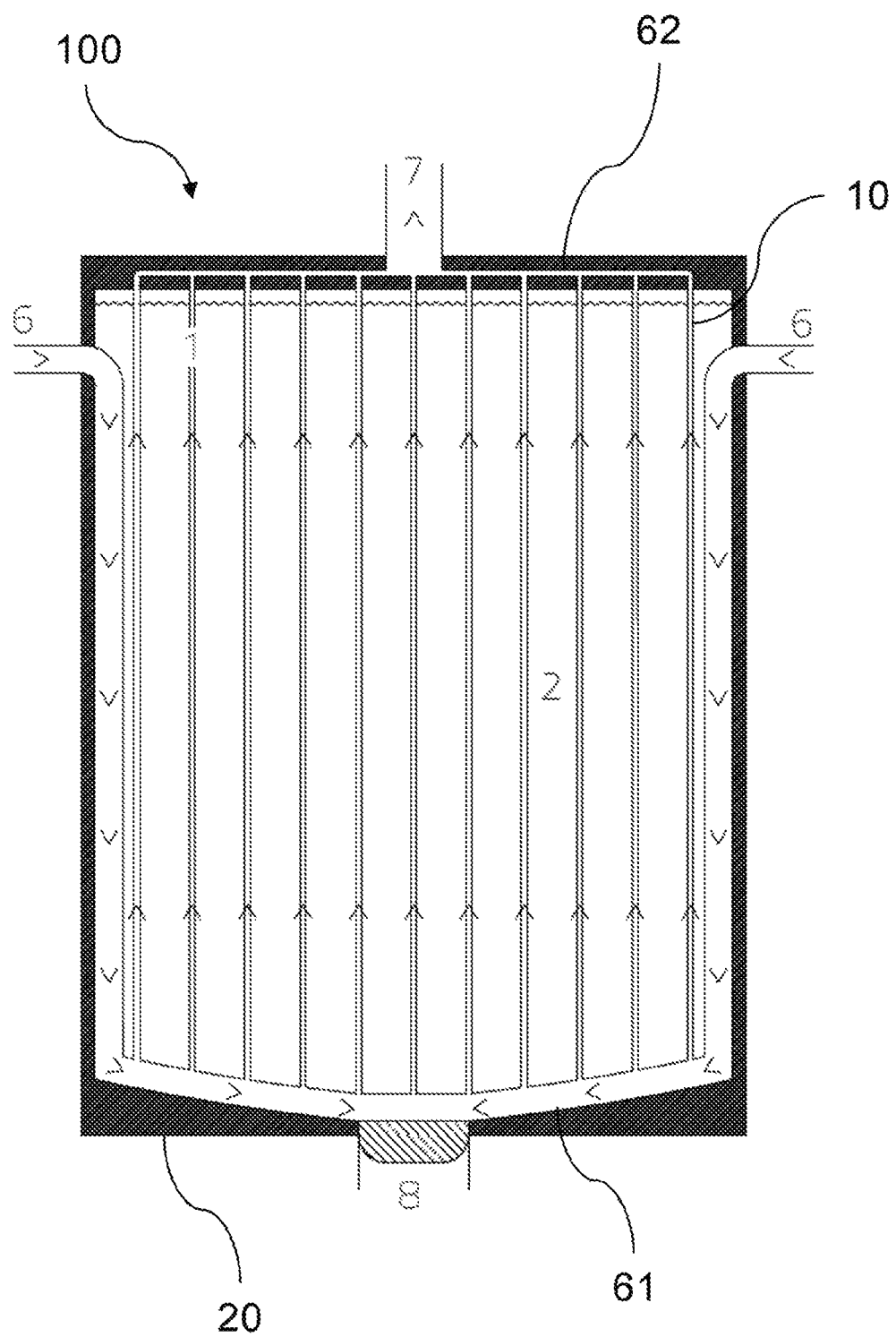
FIG. 1 shows a side view of a device of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Preferred Moderator Materials

As mentioned above, the present invention suggests hydroxides and/or deuteroxides as moderator materials. Metal hydroxides are preferred. The at least one metal hydroxide or deuteroxide may for instance comprise a metal chosen from the group of metals comprising alkali metals, lithium (Li), sodium (Na), potassium (K), rubidium (Rb), caesium (Cs), carbon (C), silicon (Si) and fluorine (F). Further preferred are fused metal hydroxides of the form $X(OH)_n$, and fused metal deuteroxide of the form $X(OD)_n$. Fused metal hydroxides are compounds generally written as XOH or X(OH)n where X is an alkali or other metal and OH is the hydroxide ion. The integer n equals 1 for monovalent atoms and is an integer>1 for higher valence atoms. The effective moderating effect of fused metal hydroxide lies in the relative high presence of hydrogen in the compound. Fused metal hydroxides have a wide temperature operating window (from melting point to boiling point typically ranging from 300° C. to 1300° C.). The liquid molten salts are pumpable at near atmospheric pressure and therefore do not require a pressurized containment. The fused metal hydroxide moderator may consist of a single chemical compound, such as NaOH, or a mixture of 2 or more metal hydroxides, mixed with other fluids, or embedded into solid materials. Particularly useful metal hydroxides are LiOH, $^7$LiOH, NaOH and rubidium hydroxide (RbOH). Likewise, particularly useful metal deuteroxides are LiOD, $^7$LiOD, NaOD and RbOD.

Metal hydroxides such as potassium hydroxide (KOH) and caesium hydroxide (CsOH) as well as metal deuteroxides such as KOD and CsOD are, due to their very high neutron absorption, useful as additively used hydroxides or deuteroxides for adjusting the neutron absorption of the moderator materials in embodiments where the fused metal hydroxide moderator comprises a mixture of two or more metal hydroxides and/or metal deuteroxides.

Rubidium (Rb) and sodium (Na) are both excellent in their natural form. lithium (Li) enriched to 99.95% or more in $^7$Li has comparable neutronics to Na (higher-enriched Li surpasses Na), while potassium (K) and caesium (Cs) performs worse in terms of neutronics, but is of interest because it can be added to other alkali hydroxides to alter certain physical and chemical properties of the mixture, such as the melting point. Of these, NaOH has the advantage of being very well known as an industrial chemical.

Table 2 below summarises moderating properties of various moderator materials suggested in accordance with the present invention.

TABLE 2

Moderating effect of various hydroxides.

| Material | N [#] | $MFP_{ela}$ [cm] | $\Sigma_{abs}$ [1/m] | Comments |
|---|---|---|---|---|
| $^7$LiOH | 38.0 | 1.08 | 1.385 | Compact, low absorption |
| NaOH | 43.6 | 1.13 | 2.767 | Compact |
| KOH | 44.9 | 1.66 | 5.546 | |
| RbOH | 45.9 | 1.76 | 1.340 | Compact fairly low absorption |
| CsOH | 46.3 | 2.38 | 43.337 | |

The information in Table 2 above leads to the following conclusions. NaOH is a compact moderator and the absorption is comparable to $H_2O$ and polyethylene. RbOH is a compact moderator and has a fairly low absorption. KOH and CsOH are both less suitable as a moderator owing to high absorption.

NaOH, or sodium hydroxide, commonly known as lye or caustic soda, is a well-known industrial product used in soaps, food production, as drain cleaner, in aluminium production and much more. At room temperature and atmospheric pressure, NaOH is solid but melts at a temperature of 318° C. and boils at 1388° C. This makes it a very flexible neutron moderator, as it can be used in either solid or liquid state. Moreover, passive safety features can be designed in which active cooling of solid NaOH is required to keep the moderator in place in the reactor core. In the event of overheating (from power excursion or loss of active cooling), the NaOH would melt and drain out of the core, effectively extinguishing the fission chain reaction.

Even if the use of NaOH as a neutron moderator has been rejected in the past, based on the corrosive properties of liquid NaOH as described above, the advantages related to hydroxides in general as moderator materials listed above are especially profound in relation to NaOH, and the present invention, and in particular the suggested measures for corrosion control and choice of materials, make these concerns obsolete.

Preferred Redox-Elements

Exemplary standard electrode potentials are provided in Table 3, where the standard electrode potentials are at a temperature of 298.15° K, an effective concentration of 1 mol/l for each aqueous species or a species in a mercury amalgam, a partial pressure of 101.325 kPa (absolute) (1 atm, 1.01325 bar) for a gaseous reagent, and an activity of unity for each pure solid, pure liquid, or for water (solvent). It is to be understood that a lower negative value for the standard electrode potential corresponds to a more reactive material in the context of the invention. Thus for example, the inner tubing material may be nickel and any element in the Reductant column above nickel can be selected as a redox-element.

TABLE 3

Standard electrode potentials

| Oxidant | Reductant | Value (V) |
|---|---|---|
| $Sr^+ + e-$ | Sr | −4.101 |
| $Ca^+ + e-$ | Ca | −3.8 |
| $Li^+ + e-$ | Li | −3.0401 |
| $Cs^+ + e-$ | Cs | −3.026 |
| $Rb^+ + e-$ | Rb | −2.98 |
| $K^+ + e-$ | K | −2.931 |
| $Ba^{2+} + 2e-$ | Ba | −2.912 |
| $Sr^{2+} + 2e-$ | Sr | −2.899 |
| $Ca^{2+} + 2e-$ | Ca | −2.868 |
| $Eu^{2+} + 2e-$ | Eu | −2.812 |
| $Ra^{2+} + 2e-$ | Ra | −2.8 |
| $Yb^{2+} + 2e-$ | Yb | −2.76 |
| $Na^+ + e-$ | Na | −2.71 |
| $Mg^+ + e-$ | Mg | −2.7 |
| $Sm^{2+} + 2e-$ | Sm | −2.68 |
| $No^{2+} + 2e-$ | No | −2.5 |
| $Tm^{2+} + 2e-$ | Tm | −2.4 |
| $Md^{2+} + 2e-$ | Md | −2.4 |
| $La^{3+} + 3e-$ | La | −2.379 |
| $Mg^{2+} + 2e-$ | Mg | −2.372 |
| $Y^{3+} + 3e-$ | Y | −2.372 |
| $Pr^{3+} + 3e-$ | Pr | −2.353 |
| $Ce^{3+} + 3e-$ | Ce | −2.336 |
| $Er^{3+} + 3e-$ | Er | −2.331 |
| $Ho^{3+} + 3e-$ | Ho | −2.33 |
| $Nd^{3+} + 3e-$ | Nd | −2.323 |
| $Tm^{3+} + 3e-$ | Tm | −2.319 |
| $Sm^{3+} + 3e-$ | Sm | −2.304 |
| $Fm^{2+} + 2e-$ | Fm | −2.3 |
| $Dy^{3+} + 3e-$ | Dy | −2.295 |
| $Lu^{3+} + 3e-$ | Lu | −2.28 |
| $Tb^{3+} + 3e-$ | Tb | −2.28 |
| $Gd^{3+} + 3e-$ | Gd | −2.279 |
| $Es^{2+} + 2e-$ | Es | −2.23 |
| $Dy^{2+} + 2e-$ | Dy | −2.2 |
| $Pm^{2+} + 2e-$ | Pm | −2.2 |
| $Ac^{3+} + 3e-$ | Ac | −2.2 |

TABLE 3-continued

Standard electrode potentials

| Oxidant | Reductant | Value (V) |
|---|---|---|
| $Yb^{3+} + 3e-$ | Yb | −2.19 |
| $Cf^{2+} + 2e-$ | Cf | −2.12 |
| $Ho^{2+} + 2e-$ | Ho | −2.1 |
| $Nd^{2+} + 2e-$ | Nd | −2.1 |
| $Sc^{3+} + 3e-$ | Sc | −2.077 |
| $Am^{3+} + 3e-$ | Am | −2.048 |
| $Cm^{3+} + 3e-$ | Cm | −2.04 |
| $Pu^{3+} + 3e-$ | Pu | −2.031 |
| $Er^{2+} + 2e-$ | Er | −2 |
| $Pr^{2+} + 2e-$ | Pr | −2 |
| $Eu^{3+} + 3e-$ | Eu | −1.991 |
| $Lr^{3+} + 3e-$ | Lr | −1.96 |
| $Cf^{3+} + 3e-$ | Cf | −1.94 |
| $Es^{3+} + 3e-$ | Es | −1.91 |
| $Am^{2+} + 2e-$ | Am | −1.9 |
| $Th^{4+} + 4e-$ | Th | −1.899 |
| $Fm^{3+} + 3e-$ | Fm | −1.89 |
| $Np^{3+} + 3e-$ | Np | −1.856 |
| $Be^{2+} + 2e-$ | Be | −1.847 |
| $U^{3+} + 3e-$ | U | −1.798 |
| $Al^{3+} + 3e-$ | Al | −1.662 |
| $Ti^{2+} + 2e-$ | Ti | −1.63 |
| $Zr^{4+} + 4e-$ | Zr | −1.45 |
| $Ti^{3+} + 3e-$ | Ti | −1.37 |
| $Mn^{2+} + 2e-$ | Mn | −1.185 |
| $V^{2+} + 2e-$ | V | −1.13 |
| $Nb^{3+} + 3e-$ | Nb | −1.099 |
| $Zn^{2+} + 2e-$ | Zn | −0.7618 |
| $Cr^{3+} + 3e-$ | Cr | −0.74 |
| $Ta^{3+} + 3e-$ | Ta | −0.6 |
| $Ga^{3+} + 3e-$ | Ga | −0.53 |
| $Fe^{2+} + 2e-$ | Fe | −0.44 |
| $Cd^{2+} + 2e-$ | Cd | −0.4 |
| $In^{3+} + 3e-$ | In | −0.34 |
| $Tl^{+} + e-$ | Tl | −0.34 |
| $Co^{2+} + 2e-$ | Co | −0.28 |
| $Ni^{2+} + 2e-$ | Ni | −0.25 |

In a preferred embodiment the inner tubing material comprises a metal, and the redox-element is a metal having an electronegativity according to the Pauling scale, which is lower than the electronegativity of the metal of the inner tubing material. Pauling electronegativities of a range of metallic elements is provided in Table 4. For example, the metal of the inner tubing and optionally also of the core container may be a Hastelloy, i.e. a nickel-based alloy, and the redox-element may be an alkali metal or an alkaline earth metal.

TABLE 4

Pauling electronegativities of selected elements

| Tin (Sn) | 1.96 |
|---|---|
| Silver (Ag) | 1.93 |
| Nickel (Ni) | 1.91 |
| Silicon (Si) | 1.9 |
| Copper (Cu) | 1.9 |
| Technetium (Tc) | 1.9 |
| Rhenium (Re) | 1.9 |
| Cobalt (Co) | 1.88 |
| Iron (Fe) | 1.83 |
| Gallium (Ga) | 1.81 |
| Indium (In) | 1.78 |
| Cadmium (Cd) | 1.69 |
| Chromium (Cr) | 1.66 |
| Zinc (Zn) | 1.65 |
| Vanadium (V) | 1.63 |
| Thallium (Tl) | 1.62 |
| Aluminium (Al) | 1.61 |
| Niobium (Nb) | 1.6 |
| Beryllium (Be) | 1.57 |
| Manganese (Mn) | 1.55 |
| Titanium (Ti) | 1.54 |
| Tantalum (Ta) | 1.5 |
| Protactinium (Pa) | 1.5 |
| Uranium (U) | 1.38 |
| Scandium (Sc) | 1.36 |
| Neptunium (Np) | 1.36 |
| Zirconium (Zr) | 1.33 |
| Magnesium (Mg) | 1.31 |
| Hafnium (Hf) | 1.3 |
| Thorium (Th) | 1.3 |
| Americium (Am) | 1.3 |
| Curium (Cm) | 1.3 |
| Berkelium (Bk) | 1.3 |
| Californium (Cf) | 1.3 |
| Einsteinium (Es) | 1.3 |
| Fermium (Fm) | 1.3 |
| Mendelevium (Md) | 1.3 |
| Nobelium (No) | 1.3 |
| Plutonium (Pu) | 1.28 |
| Lutetium (Lu) | 1.27 |
| Thulium (Tm) | 1.25 |
| Erbium (Er) | 1.24 |
| Holmium (Ho) | 1.23 |
| Yttrium (Y) | 1.22 |
| Dysprosium (Dy) | 1.22 |
| Gadolinium (Gd) | 1.2 |
| Samarium (Sm) | 1.17 |
| Neodymium (Nd) | 1.14 |
| Praseodymium (Pr) | 1.13 |
| Cerium (Ce) | 1.12 |
| Lanthanum (La) | 1.1 |
| Actinium (Ac) | 1.1 |
| Calcium (Ca) | 1 |
| Lithium (Li) | 0.98 |
| Strontium (Sr) | 0.95 |
| Sodium (Na) | 0.93 |
| Radium (Ra) | 0.9 |
| Barium (Ba) | 0.89 |
| Potassium (K) | 0.82 |
| Rubidium (Rb) | 0.82 |
| Caesium (Cs) | 0.79 |

Thus, based on Table 3 and Table 4, and in light of Reaction (A) to Reaction (D), preferred materials for the inner tubing and/or the core container comprise nickel, copper and cobalt, and preferred metals for the redox-element comprise alkali metals, alkaline earth metals, transition metals, lanthanides and/or actinides.

Fuel Salt Composition

The fuel salt (abbreviated FS) in general consists of a non-actinide carrier part (chosen for its thermodynamic properties), and an actinide component ensuring reactor criticality. The actinide component $An_i$ may further be split up in a fuel component and an added fertile component. The fuel salt vector $F_i$ is described by a pre-defined fuel vector which contains an initial plutonium component (typically Spend Nuclear Fuel (SNF) i.e. nuclear waste) along with additional components (some added after chemical reprocessing). The added (fertile) part is defined by the vector $A_i$ which is chosen from its role in the reactor burnup process and will typically consist of added thorium and uranium. The actinide composition is defined by the various fuel vectors and is captured by the following values of merit:

$F_{Pu}$ the fuel plutonium (cation mole) fraction;
$A_{Th}$ the fuel thorium (cation mole) fraction of the added fertile vector;
$F_A$ the added (fertile) (cation mole) fraction.

Here the two first fractions refer to the cation mole fractions of the fuel vector and the added fertile vector, respectively. The fuel salt is defined by the various fuel vectors, a carrier salt vector $CS_i$, along with the following values of merit for the fuel salt:

$FS_{Pu}$ the fuel salt plutonium (cation mole) fraction;
$FS_{Th}$ the fuel salt thorium (cation mole) fraction;
$FS_{CS}$ the carrier salt (cation mole) fraction.

Here "fraction" refers to the cation mole fraction of the combined fuel salt. With these definitions, the fuel salt vector can be written: $(FS)_i = FS_{CS} \, CS_i + (1-FS_{CS}) \, An_i$. The actinide vector is split up according to: $An_i = (1-F_A) F_i + F_A \cdot A_i$. Here $F_{Pu}$ of $F_i$ consists of plutonium isotopes and $A_{Th}$ of $A_i$ consists of thorium. We note that the following relations exist between the salt parameters:

$$FS_{Pu} = (1-FS_{CS})(1-F_A) F_{Pu}; \quad FS_{Th} = (1-FS_{CS}) F_A \cdot A_{Th}$$

An exemplary fuel salt contains the following fuel salt vectors: $CS_i = NaF$; $A_i = ThF_4$. This fuel is summarised in Table 5.

TABLE 5

A preferred fuel salt composition

| Fraction | cmol % | Motivation |
|---|---|---|
| $FS_{CS}$ | 78 | Eutectic point |
| $F_{Pu}$ | 80 | Chemical reprocessing |
| $f^{238}U$ | 97.5 | Chemical reprocessing |
| $A_{Th}$ | 100 | Waste burning |
| $F_A$ | ≈90 | Optimization study |
| $f^{238}Pu$ | 0.5 | Industry waste standard |
| $f^{239}Pu$ | 69 | Industry waste standard |
| $f^{240}Pu$ | 25 | Industry waste standard |
| $f^{241}Pu$ | 2 | Industry waste standard |
| $f^{242}Pu$ | 1 | Industry waste standard |
| $f^{241}Am$ | 2.5 | Industry waste standard |
| $S_{Pu}$ | ≈2 | — |
| $S_{Th}$ | ≈20 | — |

Preferred Device of the Invention

A preferred device 100 of the invention is illustrated in FIG. 1, where it is depicted from the side. Specifically, FIG. 1 shows the device 100, which has a core container 20 with a molten moderator salt 2, which core container 20 encloses an inner tubing with a molten fuel salt 1. The inner tubing has two inlets 6 in fluid communication with an inlet manifold 61, which in turn is in fluid communication with the fuel pins 10. The fuel pins 10 communicate with an outlet manifold 62, which collects the flow, in this case of molten fuel salt 1 in a single outlet 7. The direction of the flow is indicated with the symbol ">". The inlets 6 and the outlet 7 are in fluid communication with an inlet and an outlet of a heat exchanger (not shown) to provide a heat exchange loop. The inner tubing material and the core container material are preferably made from a nickel based alloy. The device 100 may further comprise an additional safety feature 8 comprising an overflow system in addition to the commonly used salt plug system of the prior art. This safety system prevents meltdowns, hinders accidents from human operator error, automatically shuts down in case of out of scope operation conditions, and may flush the fuel inventory to a passively cooled and sub-critical dump tank below the core vessel in case of a loss of operation power.

The reactor size is determined from two conditions; circulation time and negative temperature feedback for both fuel and moderator. In practice the operating power density can be adjusted through physical feedback mechanisms in the reactor core. In particular, the negative temperature feedback of both the fuel salt and the moderator means that the power density can be controlled by adjusting the external energy in-flow. Since core circulation may carry delayed neutrons away from the chain reaction, the mass flow rate through the reactor core should be held constant for optimal reactor control and safety reasons. Rather than changing the internal core flow, it is more desirable to control the power production by varying the mass flow through the external heat exchanger system. In order to attain maximal reactor control, the mass flow rate through the reactor should be chosen so that the change in the reactor reactivity as compared to no circulation is as small as practically possible. In this way, in case of pump failure scenario, the concentration of decaying precursors in the reactor core will only be minimally larger than at normal operation.

Figure 2:
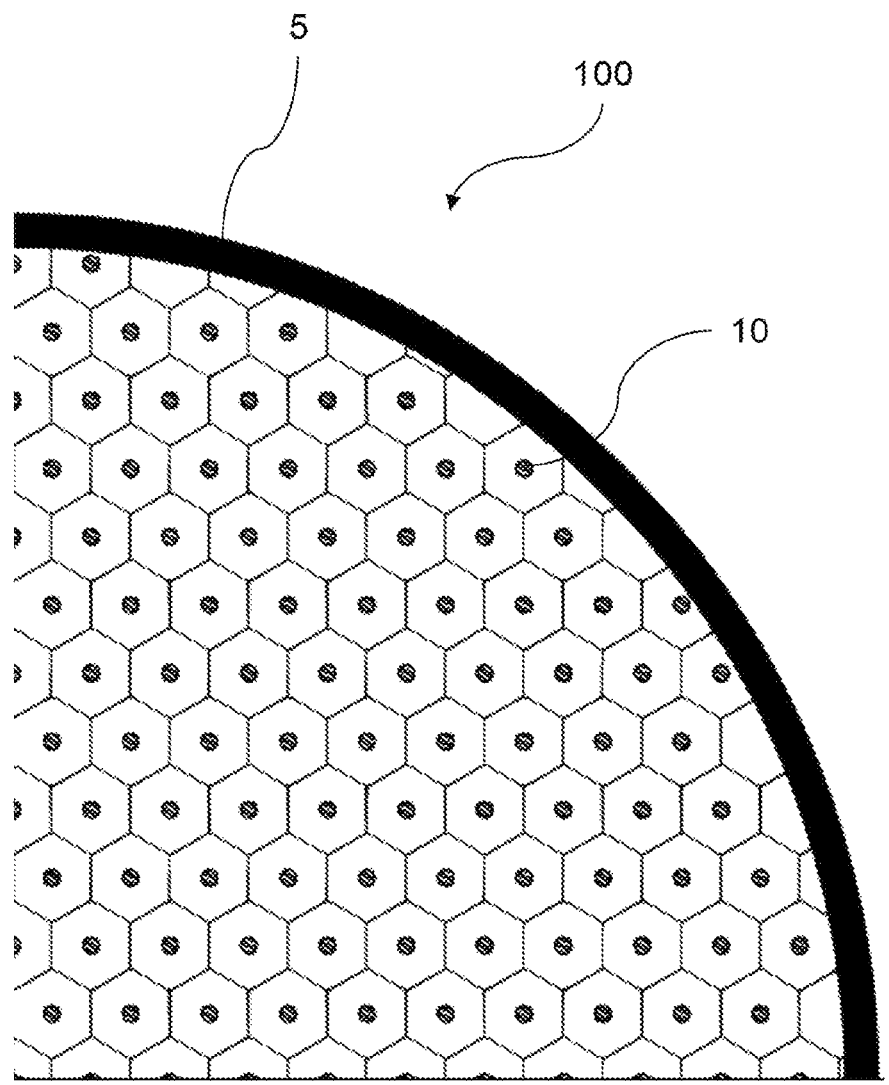
FIG. 2 shows a top view of a device of the invention.

FIG. 2 shows a top view of a section of the device 100 shown in FIG. 1. Thus, the fuel pins 10 are distributed in a hexagonal pattern in the core container, which has a cylindrical cross-section with an external cladding 5. The external cladding may also be referred to as a blanket or shielding. A hexagonal pattern is superimposed on the cross-section of the device 100, but this pattern is not intended to represent any specific material.

Figure 3:
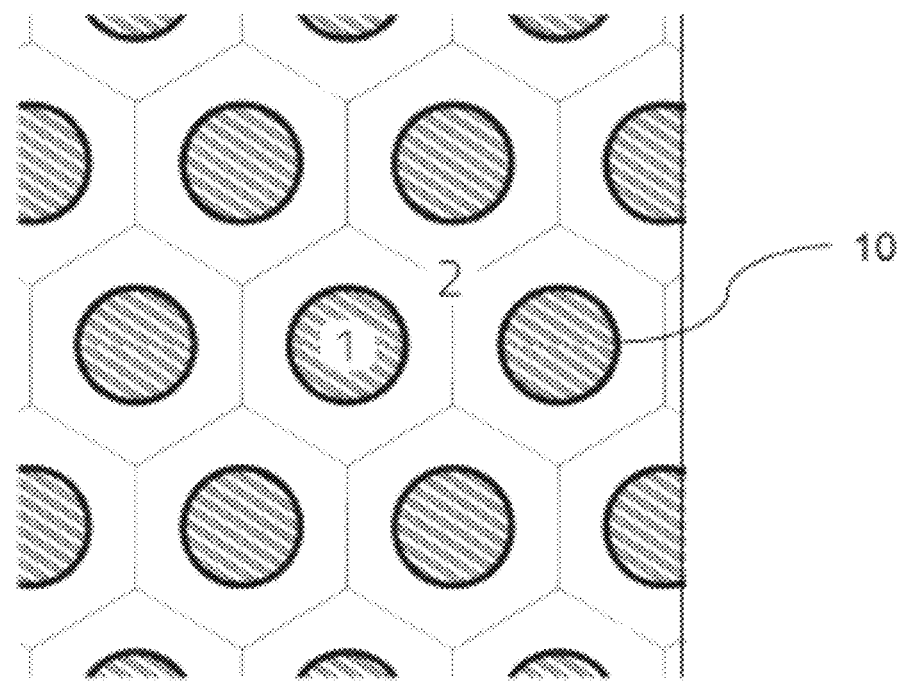
FIG. 3 shows a top view of detail of a device of the invention.
Figure 4:
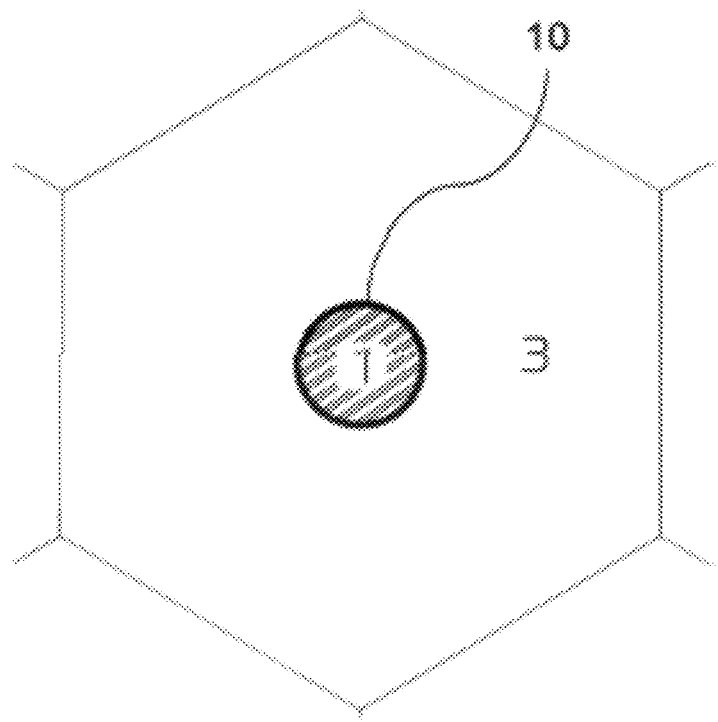
FIG. 4 shows a top view of detail of a prior art molten salt reactor.

FIG. 3 and FIG. 4 illustrate and compare the packing of the fuel pins 10 of a preferred device of the invention (FIG. 3) and a prior art MSR (FIG. 4) where graphite 3 is used as a moderator. The superimposed hexagonal patterns show how the metal hydroxide/deuteroxide moderator allows a much denser packing of the fuel pins 10 than available in the graphite moderated MSR thus providing a much smaller form factor F.

Figure 5:
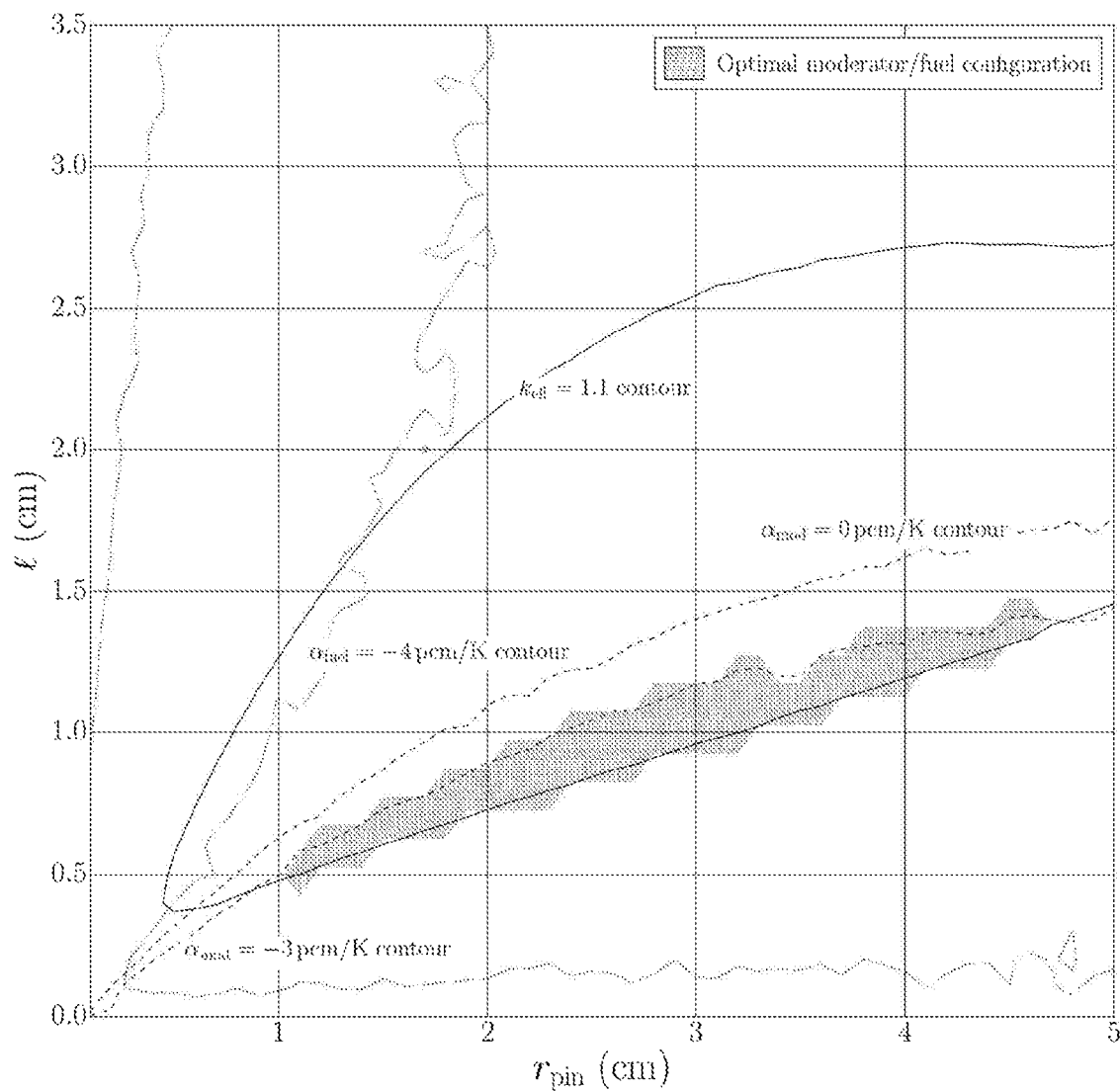
FIG. 5 shows contour plots of the reactor multiplication factor and the thermal reactivity coefficients of the fuel and NaOH moderator.

FIG. 5 shows contour plots of the reactor multiplication factor and thermal reactivity coefficients of the fuel salt and the NaOH moderator, respectively. The multiplication factor needs to be above a certain threshold to ensure that the reactor can reach criticality. Moreover, the reactivity coefficients should be lightly negative for optimal reactor control and (inherent) safety reasons. The zone of configuration space 9 compatible with all three conditions allows determination of the ranges on the reactor dimensions. Specifically, the fuel content $S_{Pu}$ is 2 cmol % and the radius $r_{pin}$ of the fuel pins may be in the range of 1 cm to 5 cm, with the parameter l in the range of 0.5 cm to 1.5 cm.

Figure 6:
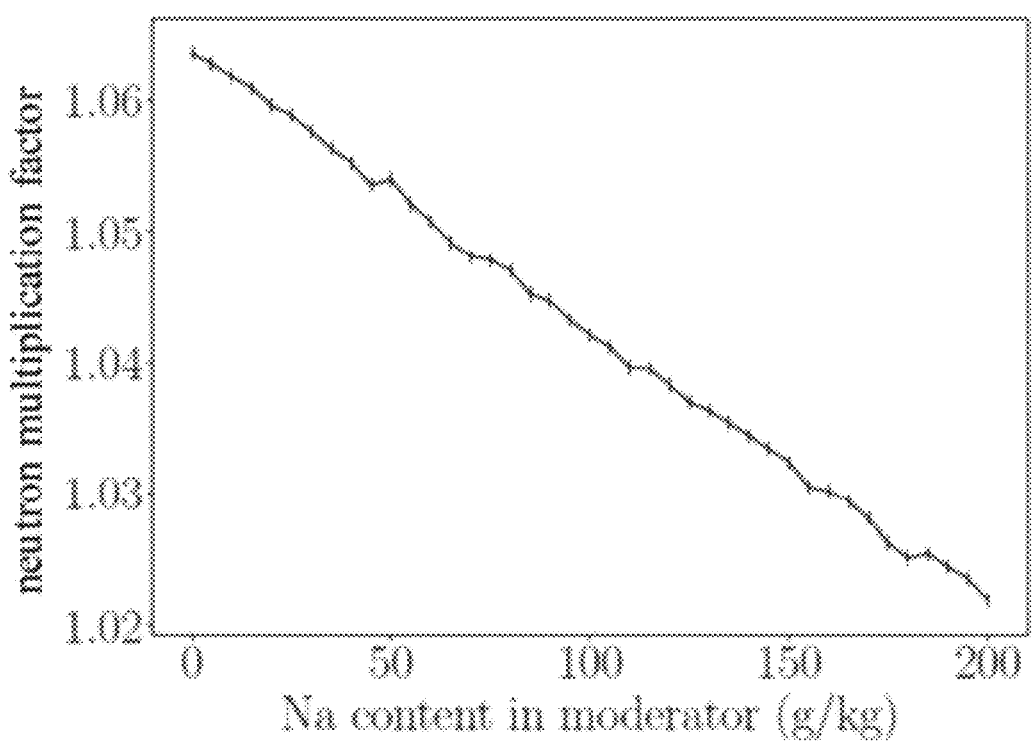
FIG. 6 shows the effect of Na in a NaOH moderator.
Figure 7:
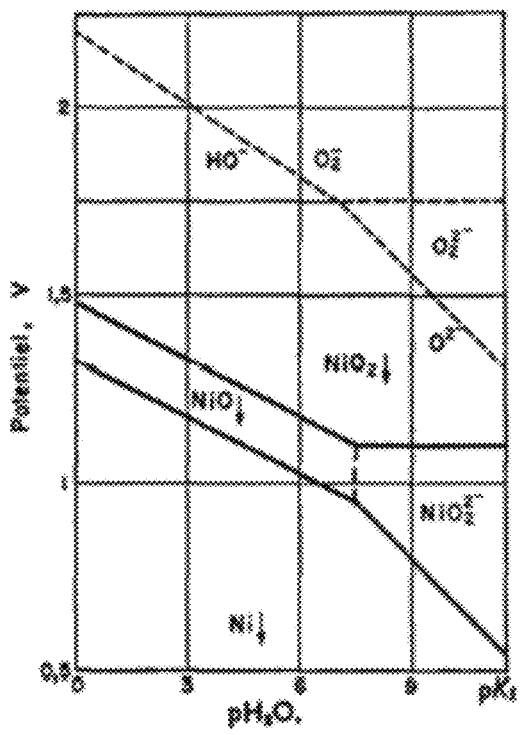
FIG. 7 shows a potential-oxoacidity diagram for nickel in NaOH—KOH.
Figure 8:
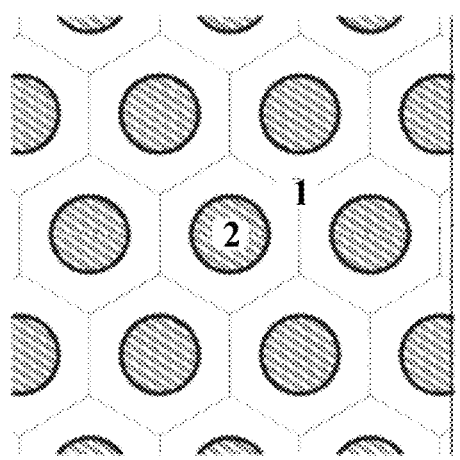
FIG. 8 shows a top view of a device with molten fuel salt located in a core container and molten moderator salt located in inner tubing.

FIG. 6 shows the dependence of the amount of Na as redox-element dissolved within NaOH as moderator salt on the neutron multiplication factor (shown on the Y-axis); the error bars are one standard deviation. Specifically, FIG. 6 illustrates the detrimental effect on the fission chain reaction from displacing hydrogen atoms in NaOH with atoms of sodium, and thus effectively diluting the moderator salt and decreasing its moderating power. Evidently an upper limit of redox-element in the moderator salt exists from the point of view of neutronics; in practice the amount of redox-element should not be higher than 100 g/kg. The lower the amount of the redox-element the better the moderating effect, but in order to provide the protection against corrosion the moderator should contain at least 1 g/kg of the redox-element.

Prior Art Examples

Since the moderating power of carbon is less than that of sodium hydroxide, graphite moderated reactors in general display a larger form-factor than sodium hydroxide moderated ones. For reference, we now provide a couple of examples of a simulated graphite moderated reactor (FIG. 4) with the same geometry and the fuel salt composition of Table 5.

A MSR with Small Pins

Fuel pin radius $r_{pin}=2$ cm. Cladding thickness δ lies in the range of 0.05 to 0.5 cm and parameter l (half the distance between neighbouring pins) is in the range l=3.0 to 6.0 cm. Within these ranges the form-factor lies in the approximate range F=5 to 15 and the core volume lies in the range V=8 m³ to 45 m³. The core radius and height are in the range H=2.0 m to 3.6 m, R=1.1 m³ to 2.0 m³ while the total number of fuel pins is in the range of 600 to 800.

A MSR with Large Pins

Fuel pin radius $r_{pin}$=6 cm. Cladding thickness δ lies in the range of 0.05 to 0.5 cm and the parameter/(half the distance between neighbouring pins) is in the range/=10.0 to 14.0 cm. Within these ranges the form-factor lies in the approximate range F=6 to 10 and the core volume lies in the range V=8 m³ to 32 m³. The core radius and height are in the range H=2.0 m to 3.2 m, R=1.1 m³ to 2.0 m³ while the total number of fuel pins is in the range of 50 to 120.

Exemplary Devices of the Invention

We refer to FIG. 5 which shows the optimum configuration zone (defined by reactor criticality and negative fuel and moderator temperature feedback) for a NaOH moderated reactor with the geometry depicted in FIG. 1 and FIG. 2 and at SPu=2 cmol %. For this plutonium fraction the allowed pin radius lies in the approximate range rpin=1 to 5 cm. We note that this range widens as the plutonium fraction grows. We proceed to give subranges for the dimensions of the reactor lattice element. The overall dimensions of the reactor core depend on the power density, form-factor and total power output of the reactor. In order to give ranges on the core dimensions it is therefore needed to assign ranges to these three parameters. We take the total power output to be 300 MW. Reasonable ranges on the power density in the fuel salt is P=100 to 200 kW/l while ranges on the form-factor are given above.

Small Pins

Fuel pin radius $r_{pin}$=1 cm. Cladding thickness δ lies in the range of 0.05 cm to 0.5 cm and the parameter/(half the distance between neighbouring pins) is in the range/=0.5 to 1.5 cm. Within these ranges the form-factor lies in the approximate range F=2.5 to 10 and the core volume lies in the range V=4 m³ to 30 m³. The core radius and height are in the range H=1.5 m to 3.0 m, R=0.9 m³ to 1.8 m³ while the total number of fuel pins is in the range of 8,000 to 12,000.

Large Pins

Fuel pin radius $r_{pin}$=5 cm. Cladding thickness δ lies in the range of 0.05 cm to 0.5 cm and the parameter (half the distance between neighbouring pins) is in the range/=1.0 to 2.5 cm. Within these ranges the form-factor lies in the approximate range F=1.6 to 2.5 and the core volume lies in the range V=2 m³ to 8 m³. The core radius and height are in the range H=1.2 m to 2.0 m, R=0.7 m³ to 1.2 m³ while the total number of fuel pins is in the range of 300 to 700.

Thus, by using the metal hydroxide based moderator with the redox-element a much smaller and more efficient MSR is obtained. The same is contemplated by impressing an electric current on the molten moderator salt where corrosion protection is also obtained.

The person skilled in the art realises that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A device adapted for producing energy by nuclear fission, the device comprising:
    a core container of a core container material, which core container encloses an inner tubing of an inner tubing material, the inner tubing and/or the core container having an inlet and an outlet;
    a molten fuel salt with a fissionable material;
    a molten moderator salt; and
    a redox-element;
    wherein the molten moderator salt is located in the core container and the molten fuel salt is located in the inner tubing, or wherein the molten fuel salt is located in the core container and the molten moderator salt is located in the inner tubing;
    wherein the molten moderator salt comprises at least one metal hydroxide, at least one metal deuteroxide or a combination thereof, and water up to 10% (w/w); and
    wherein the redox-element has a reduction potential, which is larger than that of the inner tubing material or of the inner tubing material and the core container material, and/or wherein the redox-element is a chemical species which controls the oxoacidity of the molten moderator salt and/or the molten fuel salt.

2. The device according to claim 1, wherein the redox-element is a sacrificial material located on a surface of the inner tubing material or on surfaces of the inner tubing material and the core container material.

3. The device according to claim 1, wherein the at least one metal hydroxide and/or the at least one metal deuteroxide comprises a metal chosen from the group of metals comprising alkali metals, alkaline earth metals, or combinations of alkali metals and alkaline earth metals.

4. The device according to claim 1, wherein the concentration of the redox-element is in the range of 1 g/kg to 100 g/kg of the molten moderator salt.

5. The device according to claim 1, wherein the redox-element has a melting point, which is higher than the melting point of the molten salt, and wherein the redox-element is present as a suspension of particles having a size in the range of 0.1 mm to 11 mm.

6. A method of controlling a nuclear fission process, the method comprising the steps of:
    providing a device adapted for producing energy by nuclear fission, the device comprising a core container of a core container material, which core container encloses an inner tubing of an inner tubing material, the inner tubing and/or the core container having an inlet and an outlet;
    introducing into the inner tubing a molten moderator salt comprising at least one metal hydroxide, at least one metal deuteroxide or a combination thereof, and comprising water up to 10% (w/w), and a redox-element having a reduction potential, which is larger than that of the inner tubing material, or a redox-element being a chemical species which controls the oxoacidity of the molten moderator salt;
    introducing a molten fuel salt comprising fluorides of an alkali metal, and a fissile element into the core container;
    providing a heat exchanger in fluid communication with the inlet and the outlet so as to define a heat exchange loop for removing heat from the molten moderator salt circulating in the heat exchange loop; and circulating the molten moderator salt in the heat exchange loop so as to control the temperature of the fuel salt in the core container.

7. The method according to claim 6, wherein the temperature at the inlet is in the range of 400° C. to 800° C., and wherein the temperature at the outlet is in the range of 600° C. to 1000° C.

8. The method according to claim 6, wherein the fuel salt is a eutectic salt.

9. The method according to claim 6, wherein the fuel salt comprises thorium.

10. The method according to claim 6, wherein the concentration of the redox-element is maintained by supplementing the moderator salt with the redox-element.

11. The method according to claim 6, wherein the at least one metal hydroxide and/or the at least one metal deuteroxide comprises a metal chosen from the group of metals comprising alkali metals, alkaline earth metals, or combinations of alkali metals and alkaline earth metals.

12. The method according to claim 6, wherein the concentration of the redox-element is in the range of 1 g/kg to 100 g/kg of the molten moderator salt.

13. The method according to claim 6, wherein the redox-element has a melting point, which is higher than the melting point of the molten salt, and wherein the redox-element is present as a suspension of particles having a size in the range of 0.1 mm to 11 mm.

14. The method according to claim 6, wherein the molten moderator salt comprises up to 10% (w/w) water.

15. The method according to claim 6, wherein the chemical species which can control the oxoacidity of the molten moderator salt is a gas selected from $H_2O$, $H_2$, and HF, and their mixtures.

16. A method of controlling a nuclear fission process, the method comprising the steps of:
providing a device adapted for producing energy by nuclear fission, the device comprising a core container of a core container material, which core container encloses an inner tubing of an inner tubing material, the inner tubing having an inlet and an outlet;
introducing a molten fuel salt into the inner tubing, which molten fuel salt comprises fluorides of an alkali metal and a fissile element;
introducing into the core container a molten moderator salt comprising at least one metal hydroxide, at least one metal deuteroxide or a combination thereof, and a redox-element having a reduction potential, which is larger than that of the inner tubing material or of the inner tubing material and the core container material, and/or a redox-element being a chemical species which controls the oxoacidity of the molten moderator salt;
providing a heat exchanger in fluid communication with the inlet and the outlet of the inner tubing so as to define a heat exchange loop for removing heat from the molten fuel salt circulating in the heat exchange loop; and
circulating the molten fuel salt in the heat exchange loop so as to control the temperature of the fuel salt in the inner tubing.

17. The method according to claim 16, wherein the temperature at the inlet is in the range of 400° C. to 800° C., and wherein the temperature at the outlet is in the range of 600° C. to 1000° C.

18. The method according to claim 16, wherein the fuel salt is a eutectic salt.

19. The method according to claim 16, wherein the fuel salt comprises thorium.

20. The method according to claim 16, wherein the concentration of the redox-element is maintained by supplementing the moderator salt with the redox-element.

21. The method according to claim 16, wherein the at least one metal hydroxide and/or the at least one metal deuteroxide comprises a metal chosen from the group of metals comprising alkali metals, alkaline earth metals, or combinations of alkali metals and alkaline earth metals.

22. The method according to claim 16, wherein the concentration of the redox-element is in the range of 1 g/kg to 100 g/kg of the molten moderator salt.

23. The method according to claim 16, wherein the redox-element has a melting point, which is higher than the melting point of the molten salt, and wherein the redox-element is present as a suspension of particles having a size in the range of 0.1 mm to 11 mm.

24. The method according to claim 16, wherein the molten moderator salt comprises up to 10% (w/w) water.

25. The method according to claim 16, wherein the chemical species which can control the oxoacidity of the molten moderator salt is a gas selected from $H_2O$, $H_2$, and HF, and their mixtures.

* * * * *